(12) United States Patent
Tanaka et al.

(10) Patent No.: US 12,224,403 B2
(45) Date of Patent: Feb. 11, 2025

(54) ALL-SOLID-STATE BATTERY

(71) Applicant: TDK CORPORATION, Tokyo (JP)

(72) Inventors: Kazumasa Tanaka, Tokyo (JP); Tetsuya Ueno, Tokyo (JP)

(73) Assignee: TDK CORPORATION, Tokyo (JP)

( * ) Notice: Subject to any disclaimer, the term of this patent is extended or adjusted under 35 U.S.C. 154(b) by 701 days.

(21) Appl. No.: 17/436,158

(22) PCT Filed: Mar. 9, 2020

(86) PCT No.: PCT/JP2020/010019
§ 371 (c)(1),
(2) Date: Sep. 3, 2021

(87) PCT Pub. No.: WO2020/179934
PCT Pub. Date: Sep. 10, 2020

(65) Prior Publication Data
US 2022/0140402 A1   May 5, 2022

(30) Foreign Application Priority Data
Mar. 7, 2019   (JP) ................................ 2019-041862

(51) Int. Cl.
  *H01M 10/0585*   (2010.01)
  *H01M 4/02*   (2006.01)
  *H01M 4/13*   (2010.01)
  *H01M 10/0562*   (2010.01)

(52) U.S. Cl.
  CPC ......... *H01M 10/0585* (2013.01); *H01M 4/13* (2013.01); *H01M 10/0562* (2013.01); *H01M 2004/021* (2013.01); *H01M 2004/027* (2013.01); *H01M 2004/028* (2013.01)

(58) Field of Classification Search
  CPC . H01M 10/0585; H01M 4/13; H01M 10/0562
  See application file for complete search history.

(56) References Cited

U.S. PATENT DOCUMENTS

2009/0202912 A1   8/2009   Baba et al.
2018/0233711 A1   8/2018   Kato

FOREIGN PATENT DOCUMENTS

| JP | 2009-181882 A | 8/2009 |
| JP | 2010-231969 A | 10/2010 |
| JP | 2018-133175 A | 8/2018 |
| WO | 2007/135790 A1 | 11/2007 |
| WO | 2013/001908 A1 | 1/2013 |

OTHER PUBLICATIONS

Apr. 18, 2023 Office Action issued in Chinese Patent Application No. 202080018525.1.
Apr. 21, 2020 International Search Report issued in International Patent Application No. PCT/JP2020/010019.
Aug. 8, 2023 English Translation of Office Action issued in Japanese Patent Application No. 2021-503679.

*Primary Examiner* — Sarah A. Slifka
(74) *Attorney, Agent, or Firm* — Oliff PLC

(57) ABSTRACT

This all-solid-state battery includes a laminate in which a positive electrode layer and a negative electrode layer are alternately laminated with a solid electrolyte layer interposed therebetween. The positive electrode layer includes a first positive electrode end portion exposed on a first side surface of the laminate. The negative electrode layer includes a second negative electrode end portion not exposed on the first side surface of the laminate. The all-solid-state battery includes a first uneven part formed on the first side surface of the laminate.

22 Claims, 10 Drawing Sheets

ALL-SOLID-STATE BATTERY

TECHNICAL FIELD

The present invention relates to an all-solid-state battery, for example, an all-solid-state lithium-ion secondary battery.

Priority is claimed on Japanese Patent Application No. 2019-041862, filed in Japan on Mar. 7, 2019, the content of which is incorporated herein by reference.

BACKGROUND ART

In recent years, developments in electronics technology have been remarkable, and portable electronic devices have become smaller and lighter, thinner, and more multifunctional. Along with that, there is a strong demand for batteries serving as power sources of electronic devices to be smaller and lighter, thinner, and more reliable, and all-solid-state lithium-ion secondary batteries (hereinafter, all-solid-state batteries) formed by a solid electrolyte have attracted attention.

Conventionally, in a commonly used lithium-ion secondary battery, an electrolyte (electrolytic solution) such as an organic solvent has been used as a medium for moving ions. However, in the battery of above-described configuration, there is a risk that the electrolytic solution may leak out. Further, since an organic solvent or the like used in the electrolytic solution is a combustible substance, it is required to further enhance the safety of batteries.

As one measure for enhancing the safety of batteries, it has been proposed to use a solid electrolyte instead of an electrolytic solution as the electrolyte. Further, development of an all-solid-state battery in which a solid electrolyte is used as the electrolyte and other components are also formed of solids is underway.

In order for a solid electrolyte to exhibit high conductivity, it is important to reduce grain-boundary resistance to be small by densifying the solid electrolyte in a sintering process of densifying at a high temperature. For example, an invention of an all-solid-state secondary battery formed by collectively calcining a laminate of a positive electrode unit layer, a negative electrode unit layer, and an ion-conductive inorganic material layer has been disclosed (Patent Literature 1), and a method of making a laminate without cracks by selecting a material to reduce a difference in an amount of contraction between each layer during calcination has been disclosed. On the other hand, in a lithium battery formed by laminating and calcining a solid electrolyte green sheet or a solid electrolyte layer and an electrode green sheet, it has been disclosed that cracks and delamination in each of layers can be made unlikely to occur by providing a contraction suppressing layer containing a powder of an inorganic material having a high melting point on at least one surface of a solid electrolyte green sheet or a solid electrolyte layer (Patent Literature 2).

CITATION LIST

Patent Literature

[Patent Literature 1]
PCT International Publication No. WO 2007/135790
[Patent Literature 2]
Japanese Unexamined Patent Application, First Publication No. 2009-181882

SUMMARY OF INVENTION

Technical Problem

However, in all-solid-state batteries manufactured by the above-described conventional method, it cannot be said that volume expansion and contraction due to a charge/discharge reaction is sufficiently suppressed, and cracks may occur due to internal stress generated in the all-solid-state battery. As a result, there is a problem in that the internal resistance thereof may be high and excellent cycle characteristics may not be able to be obtained easily.

The present invention has been made in view of the above-described problems, and an objective of the present invention is to provide an all-solid-state battery in which volume expansion and contraction due to a charge/discharge reaction can be sufficiently suppressed and excellent cycle characteristics can be obtained.

Solution to Problem

In order to achieve the above-described objective, the present invention provides the following means.

[1] An all-solid-state battery including a laminate in which: a positive electrode layer including a positive electrode current collector layer and a positive electrode active material layer; and a negative electrode layer including a negative electrode current collector layer and a negative electrode active material layer, are alternately laminated with a solid electrolyte layer interposed therebetween, in which the positive electrode layer includes a first positive electrode end portion exposed on a first side surface of the laminate and a second positive electrode end portion not exposed on a second side surface on a side opposite to the first side surface, the negative electrode layer includes a first negative electrode end portion exposed on the second side surface of the laminate and a second negative electrode end portion not exposed on the first side surface of the laminate, and the laminate includes at least one of a first uneven part formed on the first side surface of the laminate and a second uneven part formed on the second side surface of the laminate.

[2] The all-solid-state battery according to the above-described [1], in which the laminate further includes a positive electrode margin layer disposed between the second positive electrode end portion and the second side surface and interposed between two solid electrolyte layers adjacent to each other, and a negative electrode margin layer disposed between the second negative electrode end portion and the first side surface and interposed between two solid electrolyte layers adjacent to each other.

[3] The all-solid-state battery according to the above-described [2], in which a ten-point average roughness Rzjis of the first side surface is 1.0 μm or more in a lamination direction of the laminate.

[4] The all-solid-state battery according to the above-described [2] or [3], in which a first protruding part of the first uneven part is formed by the first positive electrode end portion, and a first recessed part of the first uneven part is formed by the solid electrolyte layer and the negative electrode margin layer.

[5] The all-solid-state battery according to the above-described [2] or [3], in which a first protruding part of the first uneven part is formed by the solid electrolyte layer and the negative electrode margin layer, and a first recessed part of the first uneven part is formed by the first positive electrode end portion.

[6] The all-solid-state battery according to any one of the above-described [3] to [5], in which the ten-point average roughness Rzjis of the first side surface is 12.0 μm or less in the lamination direction of the laminate.

[7] The all-solid-state battery according to any one of the above-described [2] to [6], in which a ten-point average roughness Rzjis of the second side surface is 1.0 μm or more in the lamination direction of the laminate.

[8] The all-solid-state battery according to any one of the above-described [2] to [7], in which a second protruding part of the second uneven part is formed by the first negative electrode end portion, and a second recessed part of the second uneven part is formed by the solid electrolyte layer and the positive electrode margin layer.

[9] The all-solid-state battery according to any one of the above-described [2] to [7], in which a second protruding part of the second uneven part is formed by the solid electrolyte layer and the positive electrode margin layer, and a second recessed part of the second uneven part is formed by the first negative electrode end portion.

[10] The all-solid-state battery according to any one of the above-described [7] to [9], in which the ten-point average roughness Rzjis of the second side surface is 12.0 μm or less in the lamination direction of the laminate.

[11] The all-solid-state battery according to the above-described [1], in which a ten-point average roughness Rzjis of the first side surface is 1.0 μm or more in a lamination direction of the laminate.

[12] The all-solid-state battery according to the above-described [1] or [11], in which a first protruding part of the first uneven part is formed by the first positive electrode end portion, and a first recessed part of the first uneven part is formed by the solid electrolyte layer.

[13] The all-solid-state battery according to the above-described [1] or [11], in which a first protruding part of the first uneven part is formed by the solid electrolyte layer, and a first recessed part of the first uneven part is formed by the first positive electrode end portion.

[14] The all-solid-state battery according to any one of the above-described [11] to [13], in which the ten-point average roughness Rzjis of the first side surface is 12.0 μm or less in the lamination direction of the laminate.

[15] The all-solid-state battery according to any one of the above-described [1] and [11] to [14], in which a ten-point average roughness Rzjis of the second side surface is 1.0 μm or more in the lamination direction of the laminate.

[16] The all-solid-state battery according to any one of the above-described [1] and [11] to [15], in which a second protruding part of the second uneven part is formed by the first negative electrode end portion, and a second recessed part of the second uneven part is formed by the solid electrolyte layer.

[17] The all-solid-state battery according to any one of the above-described [1] and [11] to [15], in which a second protruding part of the second uneven part is formed by the solid electrolyte layer, and a second recessed part of the second uneven part is formed by the first negative electrode end portion.

[18] The all-solid-state battery according to any one of the above-described [15] to [17], in which the ten-point average roughness Rzjis of the second side surface is 12.0 μm or less in the lamination direction of the laminate.

[19] The all-solid-state battery according to any one of the above-described [1] to [18], in which the laminate includes a third side surface positioned to a lateral side of the first side surface and the second side surface, the positive electrode layer includes a third positive electrode end portion positioned to a lateral side of the first positive electrode end portion and the second positive electrode end portion and configured to be exposed on the third side surface, the negative electrode layer includes a third negative electrode end portion positioned to a lateral side of the first negative electrode end portion and the second negative electrode end portion and configured to be exposed on the third side surface, and a third uneven part is provided to be formed on the third side surface of the laminate.

[20] The all-solid-state battery according to the above-described [19], in which a ten-point average roughness Rzjis of the third side surface is 1.0 μm or more in the lamination direction of the laminate.

[21] The all-solid-state battery according to the above-described [19] or [20], in which a third protruding part of the third uneven part is formed by at least one of the third positive electrode end portion and the third negative electrode end portion, and a third recessed part of the third uneven part is formed by the solid electrolyte layer.

[22] The all-solid-state battery according to the above-described [19] or [20], in which a third protruding part of the third uneven part is formed by the solid electrolyte layer, and a third recessed part of the third uneven part is formed by at least one of the third positive electrode end portion and the third negative electrode end portion.

[23] The all-solid-state battery according to any one of the above-described [20] to [22], in which a ten-point average roughness Rzjis of the third side surface is 12.0 μm or less in the lamination direction of the laminate.

Advantageous Effects of Invention

According to the present invention, it is possible to provide an all-solid-state battery in which volume expansion and contraction due to a charge/discharge reaction can be sufficiently suppressed and excellent cycle characteristics can be obtained.

BRIEF DESCRIPTION OF DRAWINGS

FIG. 1B is a cross-sectional view of a laminate in an L direction along line I-I in

FIG. 1A.

DESCRIPTION OF EMBODIMENTS

Figure 1A:
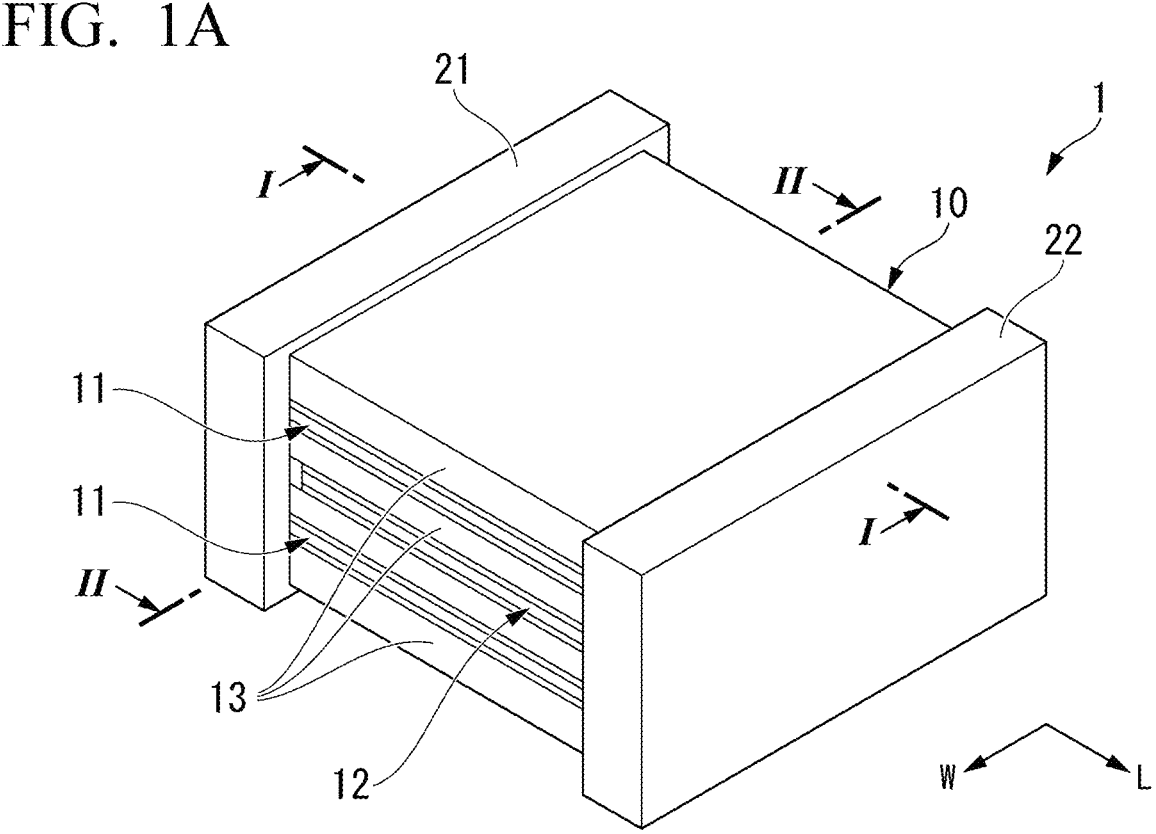
FIG. 1A is a perspective view of an all-solid-state battery according to an embodiment of the present invention.

Hereinafter, an embodiment of the present invention will be described in detail with reference to the drawings. In the drawings used in the following description, there are cases in which characteristic portions are appropriately enlarged for convenience of illustration so that characteristics of the present embodiment can be easily understood, and dimensional proportions or the like of respective constituent elements may be different from actual ones.

Materials, dimensions, and the like illustrated in the following description are merely examples, and the present embodiment is not limited thereto and can be implemented with appropriate modifications within a range in which the effects of the present invention are achieved.

[Configuration of all-Solid-State Battery]

Figure 1B:
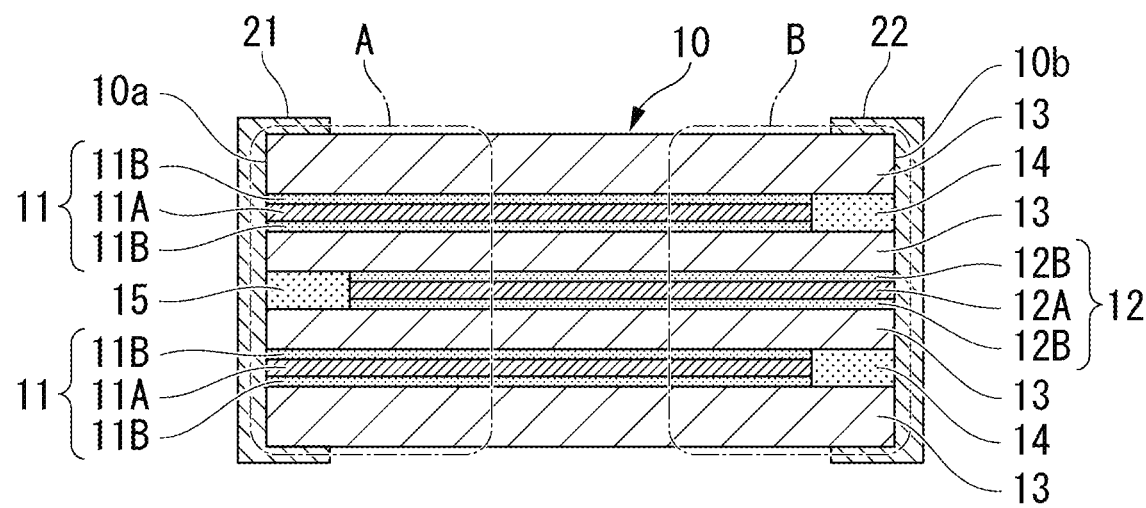
Figure 1C:
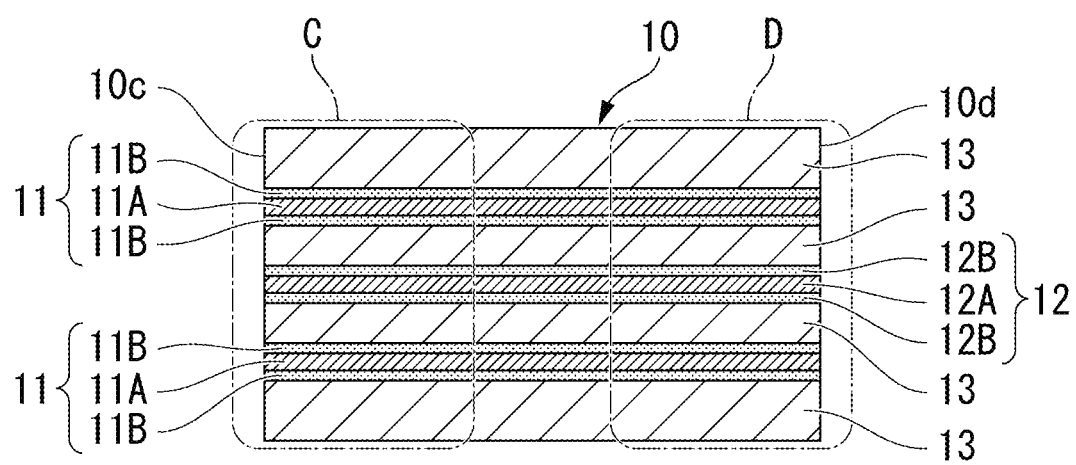
FIG. 1C is a cross-sectional view of the laminate in a W direction along line II-II in FIG. 1A.

FIG. 1A is a perspective view of an all-solid-state battery according to an embodiment of the present invention, FIG. 1B is a cross-sectional view of a laminate in an L direction along line I-I in FIG. 1A, and FIG. 1C is a cross-sectional view of the laminate in a W direction along line II-II in FIG. 1A.

As illustrated in FIGS. 1A to 1C, an all-solid-state battery 1 includes a laminate 10 in which a positive electrode layer 11 including a positive electrode current collector layer 11A and a positive electrode active material layer 11B and a negative electrode layer 12 including a negative electrode current collector layer 12A and a negative electrode active material layer 12B are alternately laminated with a solid electrolyte layer 13 interposed therebetween. The all-solid-state battery 1 is not particularly limited but is preferably an all-solid-state secondary battery, and more preferably an all-solid-state lithium-ion secondary battery.

In the present embodiment, the positive electrode layer 11 functions as a positive electrode, and the negative electrode layer 12 functions as a negative electrode.

However, the present invention is not limited thereto, and a negative electrode layer may be disposed at a position of the positive electrode layer 11 and a positive electrode layer may be disposed at a position of the negative electrode layer 12. Whether each of the electrode layers is positive or negative can be changed depending on which polarity is connected to an external terminal to be described later.

A plurality of positive electrode layers 11 and a plurality of negative electrode layers 12 are provided in the laminate 10, and when lithium ions are transferred between the positive electrode layer 11 and the negative electrode layer 12 disposed close to each other via the solid electrolyte layer, charging and discharging of the all-solid-state battery 1 is performed.

The positive electrode layer 11 is connected to an outer electrode 21, and the negative electrode layer 12 is connected to an outer electrode 22. The outer electrode 21 is formed in contact with a first side surface 10a (a side surface on which one end portion of the positive electrode layer 11 is exposed) of the laminate 10, and the outer electrode 21 is formed in contact with a second side surface 10b (a side surface on which one end portion of the negative electrode layer 12 is exposed) of the laminate 10 (FIG. 1B). The outer electrodes 21 and 22 are connected to external terminals (not illustrated) and are responsible for transfer of electrons to and from the laminate 10.

The outer electrodes 21 and 22 are preferably formed of a material having high conductivity. For example, silver, gold, platinum, aluminum, copper, tin, nickel, gallium, indium, an alloy of these, or the like can be used. Also, the outer electrodes 21 and 22 may be formed in a multilayer structure and may have a laminated structure in which, for example, a metal layer and a plating layer are laminated.

Figure 2A:
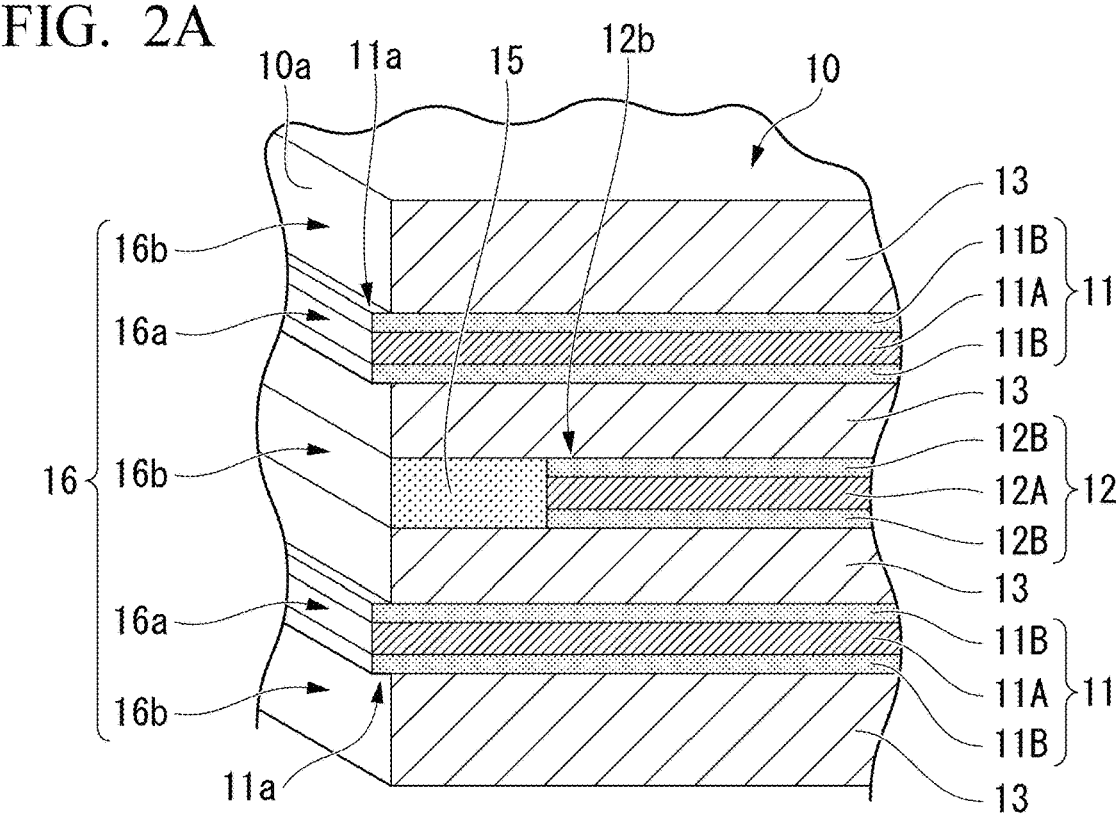
FIG. 2A is a partial cross-sectional perspective view of a region A (first side surface side) of the laminate in FIG. 1B.
Figure 2B:
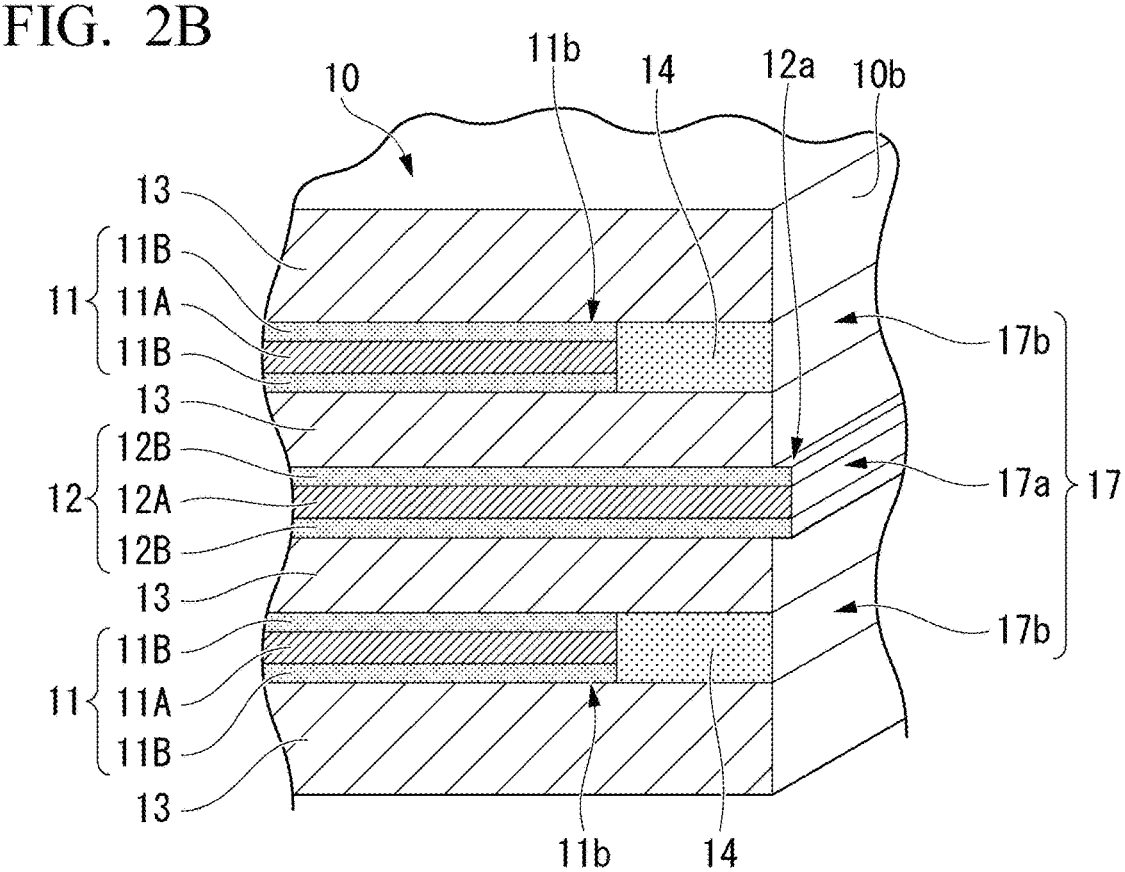
FIG. 2B is a partial cross-sectional perspective view of a region B (second side surface side) of the laminate in FIG. 1B.

FIG. 2A is a partial cross-sectional perspective view of a region A (first side surface 10a side) of the laminate 10 in FIG. 1B, and FIG. 2B is a partial cross-sectional perspective view of a region B (second side surface 10b side) of the laminate 10 in FIG. 1B.

The positive electrode layer 11 includes a first positive electrode end portion 11a exposed on the first side surface 10a of the laminate 10, and a second positive electrode end portion 11b not exposed on the second side surface 10b on a side opposite to the first side surface 10a. Also, the negative electrode layer 12 includes a first negative electrode end portion 12a exposed on the second side surface 10b of the laminate 10, and a second negative electrode end portion 12b not exposed on the first side surface 10a of the laminate 10.

The laminate 10 may include a positive electrode margin layer 14 disposed between the second positive electrode end portion 11b and the second side surface 10b and interposed between two adjacent solid electrolyte layers 13 and 13, and a negative electrode margin layer 15 disposed between the second negative electrode end portion 12b and the first side surface 10a and interposed between two adjacent solid electrolyte layers 13 and 13.

The all-solid-state battery 1 includes a first uneven part 16 formed on the first side surface 10a of the laminate 10, and a second uneven part 17 formed on the second side surface 10b of the laminate 10. The "first uneven part 16 (second uneven part 17)" is, for example, a first uneven strip part (second uneven strip part) extending in a direction substantially perpendicular to a lamination direction of the laminate 10 in a side view of the laminate 10. The first uneven part 16 (second uneven part 17) may be formed in a stripe pattern on the first side surface 10a (second side surface 10b) of the laminate 10.

The first uneven part 16 is constituted by a first protruding part 16a and a first recessed part 16b that are alternately and continuously provided in the lamination direction of the laminate 10. Also, the second uneven part 17 is constituted by a second protruding part 17a and a second recessed part 17b that are alternately and continuously provided in the lamination direction of the laminate 10.

In the present embodiment, on the first side surface 10a of the laminate 10, the first protruding part 16a of the first uneven part 16 is formed by the first positive electrode end portion 11a, and the first recessed part 16b of the first uneven part 16 is formed by the solid electrolyte layer 13 and the negative electrode margin layer 15. Also, on the second side surface 10b of the laminate 10, the second protruding part 17a of the second uneven part 17 is formed by the first negative electrode end portion 12a, and the second recessed part 17b of the second uneven part 17 is formed by the solid electrolyte layer 13 and the positive electrode margin layer 14.

In the lamination direction of the laminate 10, a ten-point average roughness Rzjis of the first side surface 10a is preferably 1.0 µm or more. When the ten-point average roughness Rzjis of the first side surface 10a is 1.0 µm or more, a sufficient buffering effect for volume expansion and contraction due to charging and discharging of the laminate 10 can be obtained. On the other hand, when the ten-point average roughness Rzjis of the first side surface 10a is less than 1.0 the buffering effect for the volume expansion and contraction cannot be obtained and cycle characteristics tend to deteriorate.

In the lamination direction of the laminate 10, the ten-point average roughness Rzjis of the first side surface 10a is preferably 12 µm or less. When the ten-point average roughness Rzjis of the first side surface 10a is 12 µm or less, a sufficient buffering effect for the volume expansion and contraction due to charging and discharging of the laminate 10 can be obtained. On the other hand, when the ten-point average roughness Rzjis of the first side surface 10a exceeds 12 cracks are likely to occur due to the volume expansion and contraction of the laminate 10, and the cycle characteristics may deteriorate.

From the above-described viewpoint, the ten-point average roughness Rzjis of the first side surface 10a is more preferably 1.0 µm or more and 12 µm or less, still more preferably 1.0 µm or more and 10 µm or less, and particularly preferably 3.0 µm or more and 5.0 µm or less.

Similarly, in the lamination direction of the laminate 10, a ten-point average roughness Rzjis of the second side surface 10b is preferably 1.0 µm or more. When the ten-point average roughness Rzjis of the second side surface 10b is 1.0 µm or more, a sufficient buffering effect for the volume expansion and contraction due to charging and discharging of the laminate 10 can be obtained. On the other hand, when the ten-point average roughness Rzjis of the second side surface 10b is less than 1.0 the buffering effect for the volume expansion and contraction cannot be obtained, and the cycle characteristics tend to deteriorate.

In the lamination direction of the laminate 10, the ten-point average roughness Rzjis of the second side surface 10b is preferably 12 µm or less. When the ten-point average roughness Rzjis of the second side surface 10b is 12 µm or less, a sufficient buffering effect for the volume expansion and contraction due to charging and discharging of the laminate 10 can be obtained. On the other hand, when the ten-point average roughness Rzjis of the second side surface 10b exceeds 12 cracks are likely to occur due to the volume expansion and contraction of the laminate 10, and the cycle characteristics may deteriorate.

From the above-described viewpoint, the ten-point average roughness Rzjis of the second side surface 10b is more preferably 1.0 µm or more and 12 µm or less, still more preferably 1.0 µm or more and 10 µm or less, and particularly preferably 3.0 µm or more and 5.0 µm or less.

Figure 3A:
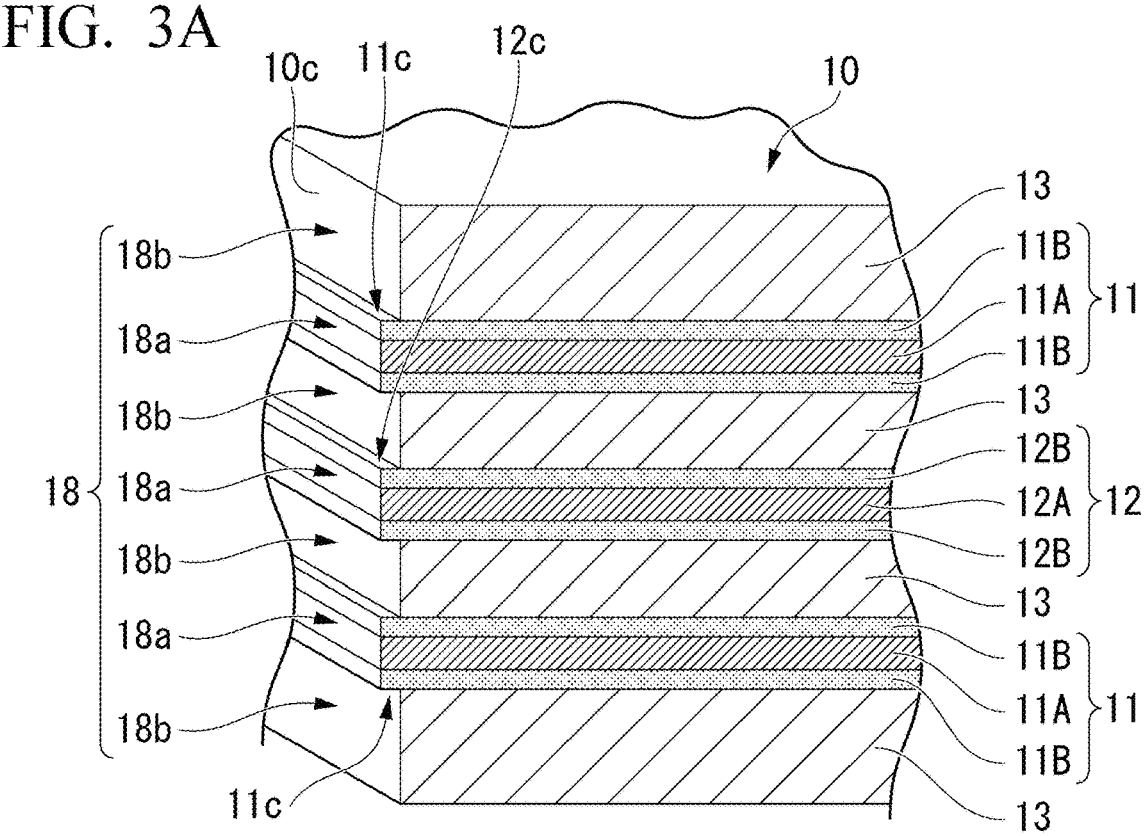
FIG. 3A is a partial cross-sectional perspective view of a region C (third side surface side) of the laminate in FIG. 1C.
Figure 3B:
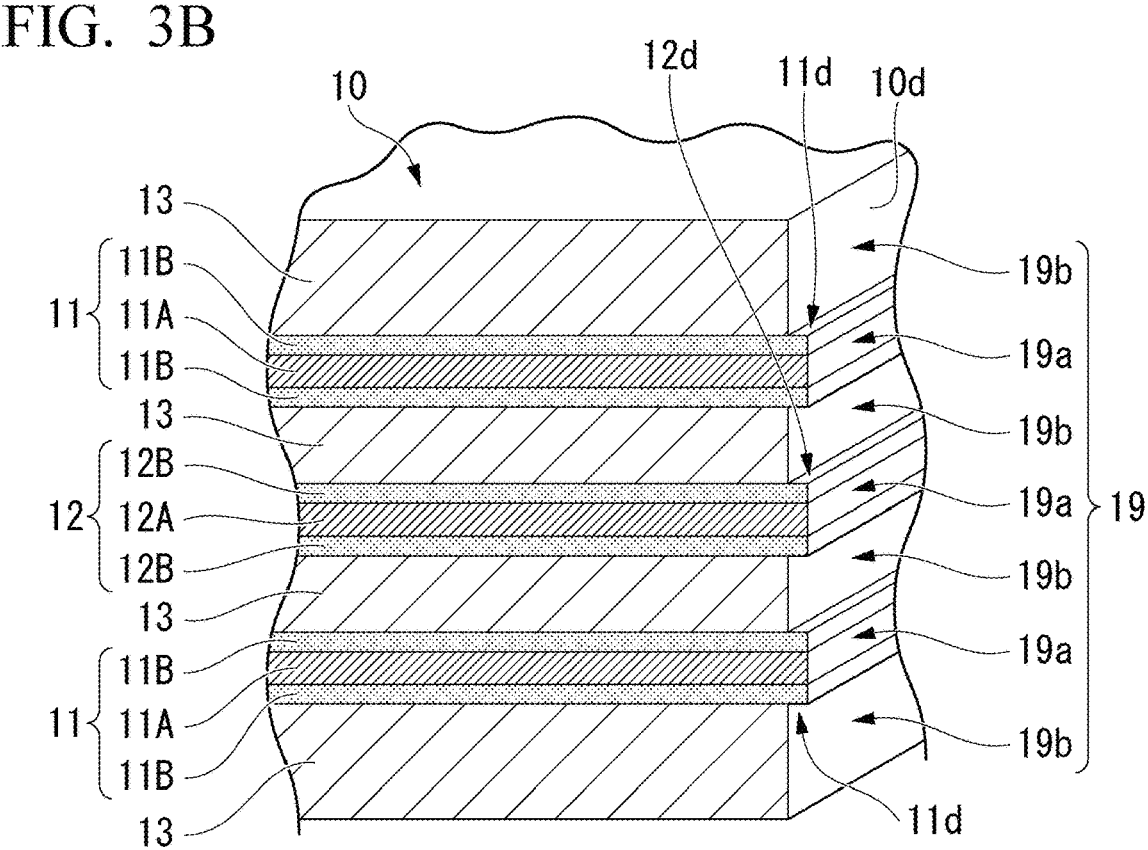
FIG. 3B is a partial cross-sectional perspective view of a region D (fourth side surface side) of the laminate in FIG. 1C.

FIG. 3A is a partial cross-sectional perspective view of a region C (third side surface 10c side) of the laminate 10 in FIG. 1C, and FIG. 3B is a partial cross-sectional perspective view of a region D (fourth side surface 10d side) of the laminate 10 in FIG. 1C.

The laminate 10 includes the third side surface 10c and the fourth side surface 10d positioned to lateral sides of the first side surface 10a and the second side surface 10b. The laminate 10 is, for example, a rectangular parallelepiped, in which the first side surface 10a and the second side surface 10b form end surfaces in the L direction (longitudinal direction), and the third side surface 10c and the fourth side surface 10d form end surfaces in the W direction (width direction).

The positive electrode layer 11 includes a third positive electrode end portion 11c positioned to a lateral side of the first positive electrode end portion 11a and the second positive electrode end portion 11b and exposed on the third side surface 10c. Also, the negative electrode layer 12 includes a third negative electrode end portion 12c positioned to a lateral side of the first negative electrode end portion 12a and the second negative electrode end portion 12b and exposed on the third side surface 10c.

The positive electrode layer 11 includes a fourth positive electrode end portion 11d positioned to a lateral side of the first positive electrode end portion 11a and the second positive electrode end portion 11b and exposed on the fourth side surface 10d. Also, the negative electrode layer 12 includes a fourth negative electrode end portion 12d positioned to a lateral side of the first negative electrode end portion 12a and the second negative electrode end portion 12b and exposed on the fourth side surface 10d.

The all-solid-state battery 1 may include a third uneven part 18 formed on the third side surface 10c of the laminate 10 and a fourth uneven part 19 formed on the fourth side surface 10d of the laminate 10.

The "third uneven part 18 (fourth uneven part 19)" is, for example, a third uneven strip part (fourth uneven strip part 19) extending in a direction substantially perpendicular to the lamination direction of the laminate 10 in a side view of the laminate 10. The third uneven part 18 (fourth uneven part 19) may be formed in a stripe pattern on the third side surface 10c (fourth side surface 10d) of the laminate 10.

The third uneven part 18 is constituted by a third protruding part 18a and a third recessed part 18b that are alternately and continuously provided in the lamination direction of the laminate 10. Also, the fourth uneven part 19 is constituted by a fourth protruding part 19a and a fourth recessed part 19b that are alternately and continuously provided in the lamination direction of the laminate 10.

In this case, for example, on the third side surface 10c of the laminate 10, the third protruding part 18a of the third uneven part 18 can be formed by the third positive electrode end portion 11c and the third negative electrode end portion 12c, and the third recessed part 18b of the third uneven part 18 can be formed by the solid electrolyte layer 13. However, the third protruding part 18a of the third uneven part 18 may be formed by either of the third positive electrode end portion 11c and the third negative electrode end portion 12c.

Similarly, on the fourth side surface 10d of the laminate 10, the fourth protruding part 19a of the fourth uneven part 19 can be formed by the fourth positive electrode end portion 11d and the fourth negative electrode end portion 12d, and the fourth recessed part 19b of the fourth uneven part 19 can be formed by the solid electrolyte layer 13. However, the fourth protruding part 19a of the fourth uneven part 19 may be formed by either of the fourth positive electrode end portion 11d and the fourth negative electrode end portion 12d.

In the lamination direction of the laminate 10, a ten-point average roughness Rzjis of the third side surface 10c and the fourth side surface 10d is preferably 1.0 µm or more. When the ten-point average roughness Rzjis of the third side surface 10c and the fourth side surface 10d is 1.0 µm or more, a sufficient buffering effect for the volume expansion and contraction due to charging and discharging of the laminate 10 can be obtained. On the other hand, when the ten-point average roughness Rzjis of the third side surface 10c and the fourth side surface 10d is less than 1.0 µm, the buffering effect for the volume expansion and contraction cannot be obtained, and the cycle characteristics tend to deteriorate.

In the lamination direction of the laminate 10, the ten-point average roughness Rzjis of the third side surface 10c and the fourth side surface 10d is preferably 12 µm or less. When the ten-point average roughness Rzjis of the third side surface 10c and the fourth side surface 10d is 12 µm or less, a sufficient buffering effect for the volume expansion and contraction due to charging and discharging of the laminate 10 can be obtained. On the other hand, when the ten-point average roughness Rzjis of the third side surface 10c and the fourth side surface 10d exceeds 12 µm, cracks are likely to occur due to the volume expansion and contraction of the laminate 10, and the cycle characteristics may deteriorate.

From the above-described viewpoint, the ten-point average roughness Rzjis of the third side surface 10c and the fourth side surface 10d is more preferably 1.0 µm or more and 12 µm or less, still more preferably 1.0 µm or more and 10 µm or less, and particularly preferably 3.0 µm or more and 5.0 µm or less.

Next, details of each constituent element constituting the laminate 10 will be specifically described.

(Positive Electrode Layer and Negative Electrode Layer)

The positive electrode current collector layer 11A and the negative electrode current collector layer 12A are formed of at least one material having high conductivity. As a material having high conductivity, a metal or an alloy containing at least one metal element of, for example, silver (Ag), palladium (Pd), gold (Au), platinum (Pt), aluminum (Al), copper (Cu), and nickel (Ni), and a non-metal such as carbon (C) can be exemplified. Of these metal elements, when manufacturing costs are considered in addition to the high conductivity, copper or nickel is preferable. Further, copper does not easily react with a positive electrode active material, a negative electrode active material, and a solid electrolyte. Therefore, when copper is used for the positive electrode current collector layer 11A and the negative electrode current collector layer 12A, an internal resistance of the all-solid-state battery 1 can be reduced. Material forming the positive electrode current collector layer 11A and the negative electrode current collector layer 12A may be the same as or different from each other. Thicknesses of the positive electrode current collector layer 11A and the negative electrode current collector layer 12A are not particularly limited, but may be, for example, 0.5 µm or more and 30 µm or less.

The positive electrode active material layer 11B is formed on one side or both sides of the positive electrode current collector layer 11A. For example, the positive electrode layer 11 positioned as an uppermost layer of the laminate 10 in the lamination direction does not have the negative electrode layer 12 facing from the side thereabove in the lamination direction. Therefore, in the positive electrode layer 11 positioned as the uppermost layer of the all-solid-state battery 1, the positive electrode active material layer 11B need only be on one side on a lower side in the lamination direction, but there is no particular problem even when it is on both sides. The negative electrode active material layer 12B is also formed on one side or both sides of the negative electrode current collector layer 12A similarly to the positive electrode active material layer 11B. Thicknesses of the positive electrode active material layer 11B and the negative electrode active material layer 12B are preferably in a range of 0.5 µm or more and 5.0 µm or less. When the thicknesses of the positive electrode active material layer 11B and the negative electrode active material layer 12B are set to 0.5 µm or more, an electrical capacity of the all-solid-state battery 1 can be increased, and on the other hand, when the thicknesses are set to 5.0 µm or less, since a diffusion distance of lithium ions decreases, the internal resistance of the all-solid-state battery 1 can be further reduced.

The positive electrode active material layer 11B and the negative electrode active material layer 12B respectively contain a positive electrode active material and a negative electrode active material that allow transfer of lithium ions and electrons thereto and therefrom. In addition, a binder, a conductive auxiliary agent, or the like may be contained. It is preferable that the positive electrode active material and the negative electrode active material can efficiently absorb and desorb lithium ions.

There is no clear distinction between the active materials constituting the positive electrode active material layer 11B and the negative electrode active material layer 12B, and when potentials of two types of compounds are compared, a compound exhibiting a higher potential can be used as the positive electrode active material, and a compound exhibiting a lower potential can be used as the negative electrode active material. Therefore, the active materials will be collectively described below.

As the active material, a transition metal oxide, a transition metal composite oxide, or the like can be used. As the transition metal oxide and the transition metal composite oxide, for example, lithium manganese composite oxide $Li_2Mn_aMa_{1-a}O_3$ (0.8≤a≤1, Ma=Co, Ni), lithium cobalt oxide ($LiCoO_2$), lithium nickel oxide ($LiNiO_2$), lithium manganese spinel ($LiMn_2O_4$), a composite metal oxide represented by a general expression: $LiNi_xCo_yMn_zO_2$ (x+y+z+a=1, 0≤x≤1, 0≤y≤1, 0≤z≤1), a lithium vanadium compound ($LiV_2O_5$), olivine type $LiM_bPO_4$ (in which, $M_b$ represents one or more elements selected from Co, Ni, Mn, Fe, Mg, Nb, Ti, Al, and Zr), lithium vanadium phosphate ($Li_3V_2(PO_4)_3$ or $LiVOPO_4$), Li-excess solid solution positive electrode represented by $Li_2MnO_3$—$LiM_cO_2$ ($M_c$=Mn, Co, Ni), lithium titanate ($Li_4Ti_5O_{12}$), a composite metal oxide represented by $Li_sNi_tCo_uAl_vO_2$ (0.9<s<1.3, 0.9<t+u+v<1.1), or the like can be exemplified.

The positive electrode current collector layer 11A and the negative electrode current collector layer 12A may respectively contain a positive electrode active material and a negative electrode active material. A content ratio of the active material contained in the current collector is not particularly limited as long as it functions as a current collector. For example, a volume ratio of positive electrode current collector/positive electrode active material or negative electrode current collector/negative electrode active material is preferably in a range of 90/10 to 70/30.

When the positive electrode current collector layer 11A and the negative electrode current collector layer 12A respectively contain the positive electrode active material and the negative electrode active material, adhesion between the positive electrode current collector layer 11A and the positive electrode active material layer 11B and between the negative electrode current collector layer 12A and the negative electrode active material layer 12B is improved.

(Solid Electrolyte Layer)

The solid electrolyte layer 13 is positioned between the positive electrode active material layer 11B and the negative electrode active material layer 12B.

Also, the solid electrolyte layer 13 may be positioned at an uppermost layer of the laminate 10 in the lamination direction (outermost layer of the laminate 10 on one side) and at a lowermost layer of the laminate 10 in the lamination direction (outermost layer of the laminate 10 on the other side). In this case, both the uppermost layer and the lowermost layer of the laminate 10 are formed by the solid electrolyte layer 13.

However, the positive electrode layer 11 may be positioned at the uppermost layer of the laminate 10 in the lamination direction, and the negative electrode layer 12 may be positioned at the lowermost layer of the laminate 10 in the lamination direction. In this case, the uppermost layer of the laminate 10 is formed by the positive electrode layer 11, and the lowermost layer of the laminate 10 is formed by the negative electrode layer 12.

Also, protective layers (not illustrated) may be positioned at the uppermost layer and the lowermost layer of the laminate 10 in the lamination direction. In that case, the uppermost layer and the lowermost layer of the laminate 10 are formed by the protective layer.

A material having low electron conductivity and high lithium-ion conductivity is preferably used for the solid electrolyte layer 13. The solid electrolyte is preferably at least one selected from the group consisting of, for example, a perovskite-type compound such as $La_{0.5}Li_{0.5}TiO_3$, a Lysicon-type compound such as $Li_{14}Zn(GeO_4)_4$, a garnet-type compound such as $Li_7La_3Zr_2O_{12}$, a Nasicon-type compound such as $LiZr_2(PO_4)_3$, $Li_{1.3}Al_{0.3}Ti_{1.7}(PO_4)_3$, and $Li_{1.5}Al_{0.5}Ge_{1.5}(PO_4)_3$, a thiolysicon-type compound such as $Li_{3.25}Ge_{0.25}P_{0.75}S_4$ and $Li_3PS_4$, a glass compound such as $Li_2S—P_2S_5$ and $Li_2O—V_2O_5—SiO_2$, and a phosphoric acid compound such as $Li_3PO_4$, $Li_{3.5}Si_{0.5}P_{0.5}O_4$, and $Li_{2.9}PO_{3.3}N_{0.46}$.

The solid electrolyte layer 13 is preferably selected according to active materials used for the positive electrode layer 11 and the negative electrode layer 12. For example, the solid electrolyte layer 13 more preferably contains the same elements as the elements constituting the active materials. When the solid electrolyte layer 13 contains the same elements as the elements constituting the active materials, bonding at interfaces of the positive electrode active material layer 11B and the negative electrode active material layer 12B with the solid electrolyte layer 13 becomes strong. Also, contact areas at the interfaces of the positive electrode active material layer 11B and the negative electrode active material layer 12B with the solid electrolyte layer 13 can be increased.

A thickness of the solid electrolyte layer 13 positioned between the positive electrode active material layer 11B and the negative electrode active material layer 12B is preferably in a range of 0.5 μm or more and 20.0 μm or less. When the thickness of the solid electrolyte layer 13 between the positive electrode active material layer 11B and the negative electrode active material layer 12B is set to 0.5 μm or more, short-circuiting between the positive electrode layer 11 and the negative electrode layer 12 can be reliably prevented, and when the thickness is set to 20.0 μm or less, since a moving distance of lithium ions is reduced, the internal resistance of the all-solid-state lithium-ion secondary battery can be further reduced.

A thickness of the solid electrolyte layer 13 positioned at the uppermost layer and the lowermost layer of the laminate 10 in the lamination direction is not particularly limited, but can be, for example, 0.5 μm or more and 20 μm or less.

(Positive Electrode Margin Layer and Negative Electrode Margin Layer)

The positive electrode margin layers 14 may be disposed to be aligned with the positive electrode layers 11 at substantially the same position in the lamination direction of the laminate 10 (FIG. 2B). The positive electrode margin layer 14 may extend from the second positive electrode end portion 11b to the second side surface 10b. The negative electrode margin layers 15 may also be disposed to be aligned with the negative electrode layers 12 at substantially the same position in the lamination direction of the laminate 10 (FIG. 2A). The negative electrode margin layer 15 may extend from the second negative electrode end portion 12b to the first side surface 10a.

Figure 4:
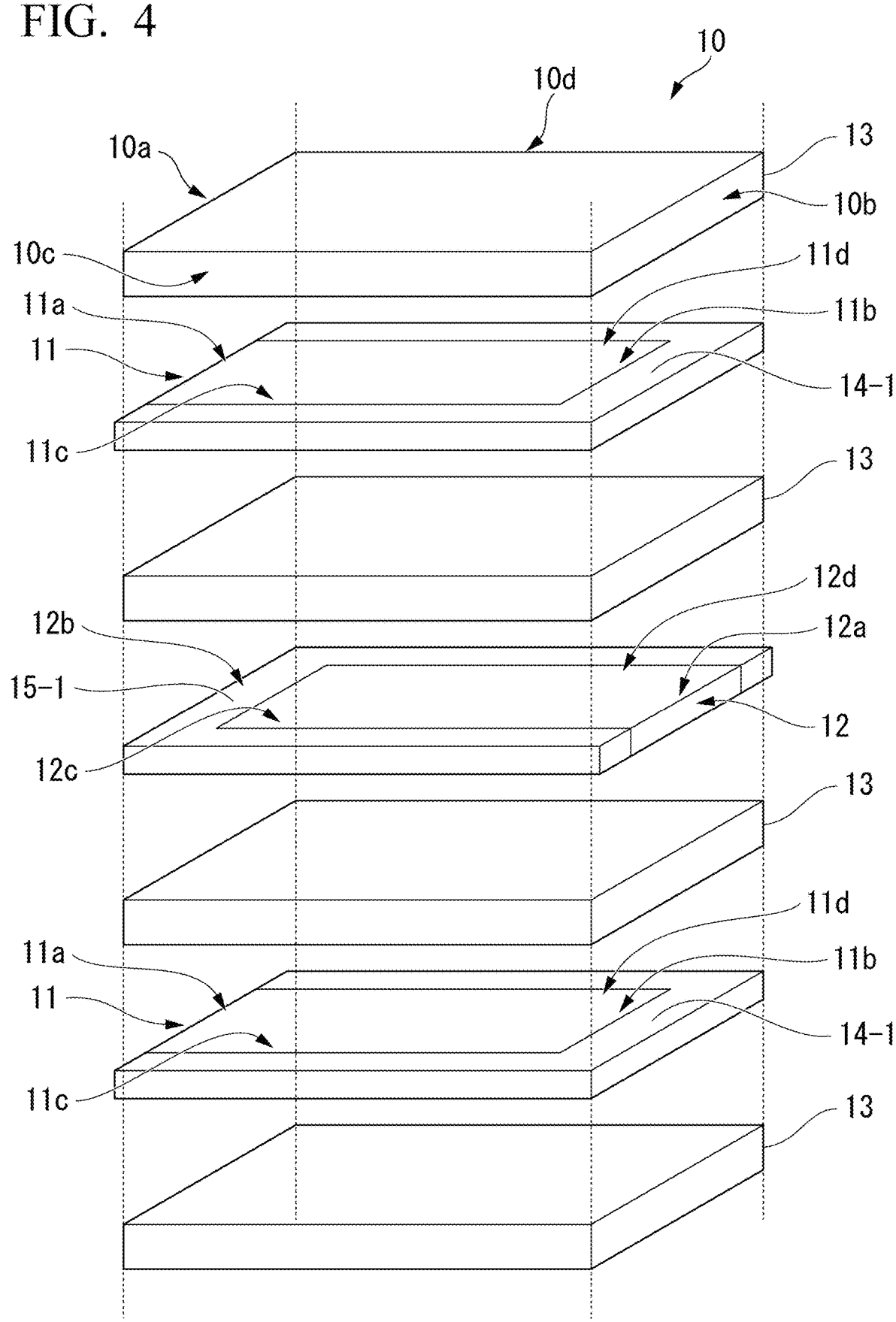
FIG. 4 is an exploded perspective view illustrating a modified example of FIG. 1A.

In the present embodiment, the positive electrode margin layer 14 is provided only on a lateral side of the second positive electrode end portion 11b among the first positive electrode end portion 11a to the fourth positive electrode end portion 11d of the positive electrode layer 11, but the present invention is not limited thereto. As illustrated in FIG. 4, a positive electrode margin layer 14-1 may be provided in the positive electrode layer 11 between the second positive electrode end portion 11b and the second side surface 10b, between the third positive electrode end portion 11c and the third side surface 10c, and between the fourth positive electrode end portion 11d and the fourth side surface 10d. In this case, the positive electrode margin layer 14-1 has an angulated U shape in a plan view, and only the first positive electrode end portion 11a of the positive electrode layer 11 is exposed on the first side surface 10a of the laminate 10.

Also, the negative electrode margin layer 15 is provided only on a lateral side of the second negative electrode end portion 12b among the first negative electrode end portion 12a to the fourth negative electrode end portion 12d of the negative electrode layer 12, but the present invention is not limited thereto. As illustrated in FIG. 4, a negative electrode margin layer 15-1 may be provided between the second negative electrode end portion 12b and the first side surface 10a, between the third negative electrode end portion 12c and the third side surface 10c, and between the fourth negative electrode end portion 12d and the fourth side surface 10d. In this case, the negative electrode margin layer 15-1 has an angulated U shape in a plan view, and only the first negative electrode end portion 12a of the negative electrode layer 12 is exposed on the second side surface 10b of the laminate 10.

In FIG. 4, only the first positive electrode end portion 11a of the positive electrode layer 11 is exposed on the first side surface 10a of the laminate 10, and only the first negative electrode end portion 12a of the negative electrode layer 12 is exposed on the second side surface 10b of the laminate 10, but the present invention is not limited thereto. In the laminate 10, only the first positive electrode end portion 11a of the positive electrode layer 11 may be exposed on the first side surface 10a, or only the first negative electrode end portion 12a of the negative electrode layer 12 may be exposed on the second side surface 10b of the laminate 10.

The positive electrode margin layer 14 or 14-1 is preferably provided to eliminate a step between the solid electrolyte layers 13 and 13 and the positive electrode layer 11 adjacent to each other, and the negative electrode margin layer 15 or 15-1 is preferably provided to eliminate a step between the solid electrolyte layers 13 and 13 and the negative electrode layer 12 adjacent to each other. Therefore, the positive electrode margin layer 14 or 14-1 is preferably formed to have substantially the same thickness as the positive electrode layer 11 between the adjacent solid electrolyte layers 13 and 13. Since the step between the solid electrolyte layer 13 and the positive electrode layer 11 and the step between the solid electrolyte layer 13 and the negative electrode layer 12 are eliminated due to the presence of the positive electrode margin layer 14 or 14-1 and the negative electrode margin layer 15 or 15-1, denseness between the solid electrolyte layer 13 and each electrode layer is increased, and delamination and warpage due to calcination of the all-solid-state battery 1 do not easily occur.

A material constituting the positive electrode margin layers 14 and 14-1 and the negative electrode margin layers 15 and 15-1 contains a solid electrolyte. The solid electrolyte contained in the positive electrode margin layer 14 and the negative electrode margin layer 15 may be the same as or different from the solid electrolyte contained in the solid electrolyte layer 13, but preferably contain the same material. Therefore, the solid electrolyte preferably contains at least one selected from the group consisting of, for example, a perovskite-type compound such as $La_{0.5}Li_{0.5}TiO_3$, a Lysicon-type compound such as $Li_{14}Zn(GeO_4)_4$, a garnet-type compound such as $Li_7La_3Zr_2O_{12}$, a Nasicon-type compound such as $LiZr_2(PO_4)_3$, $Li_{1.3}Al_{0.3}Ti_{1.7}(PO_4)_3$, and $Li_{1.5}Al_{0.5}Ge_{1.5}(PO_4)_3$, a thiolysicon-type compound such as $Li_{3.25}Ge_{0.25}P_{0.75}S_4$ and $Li_3PS_4$, a glass compound such as $Li_2S$—$P_2S_5$ and $Li_2O$—$V_2O_5$—$SiO_2$, and a phosphoric acid compound such as $Li_3PO_4$, $Li_{3.5}Si_{0.5}P_{0.5}O_4$, and $Li_{2.9}PO_{3.3}N_{0.46}$.

[Method of Manufacturing all-Solid-State Battery]

Next, a method of manufacturing the all-solid-state battery 1 will be described.

As a method of forming the laminate 10 of the all-solid-state battery 1, a simultaneous calcination method may be used or a sequential calcination method may be used. The simultaneous calcination method is a method of making a laminate by laminating materials forming each layer and then collectively calcining them. The sequential calcination method is a method in which each layer is made in sequence and is a method in which a calcination step is performed each time each layer is made. When the simultaneous calcination method is used, the laminate 10 can be formed with a smaller number of work steps as compared with a case in which the sequential calcination method is used. Also, when the simultaneous calcination method is used, the obtained laminate 10 becomes denser than when the sequential calcination method is used. Hereinafter, a case in which the laminate 10 is manufactured using the simultaneous calcination method will be described as an example.

The simultaneous calcination method includes a step of preparing a paste of each material constituting the laminate 10, a step of applying and drying the pastes to make green sheets, and a step of laminating the green sheets to form a laminated sheet and simultaneously calcining the laminated sheet.

First, each material of the positive electrode current collector layer 11A, the positive electrode active material layer 11B, the solid electrolyte layer 13, the negative electrode active material layer 12B, the negative electrode current collector layer 12A, the positive electrode margin layer 14, and the negative electrode margin layer 15 which constitute the laminate 10 is made into a paste.

As a method of making each material into a paste, for example, a powder of each material is mixed with a vehicle to obtain the paste. Here, the vehicle is a generic name for a medium in a liquid phase. A solvent and a binder are contained in the vehicle.

At this time, a contraction reducing agent can be added to the paste for the positive electrode current collector layer 11A, the paste for the positive electrode active material layer 11B, the paste for the negative electrode current collector layer 12A, and the paste for the negative electrode active material layer 12B. The contraction reducing agent is, for example, an inorganic material having a melting point higher than that of a main component of the current collector, and is, for example, a simple substance, a compound, or an alloy of a particulate metal. Thereby, contraction of the positive electrode current collector layer 11A and the negative electrode current collector layer 12A can be moderated in a subsequent calcination process, the first uneven part 16 can be formed on the first side surface 10a of the laminate 10, and the second uneven part 17 can be formed on the second side surface 10b. The contraction reducing agent may be added to either of the paste of the positive electrode current collector layer 11A and the paste of the negative electrode current collector layer 12A.

A sintering accelerator may be added to the paste for the solid electrolyte layer 13, the paste for the positive electrode margin layer 14, and the paste for the negative electrode margin layer 15. The sintering accelerator may be, for example, a generally used sintering aid. Thereby, contraction of the solid electrolyte layer 13, the positive electrode margin layer 14, and the negative electrode margin layer 15 can be promoted in the subsequent calcination process, and as a result, the first uneven part 16 can be formed on the first side surface 10a of the laminate 10, and the second uneven part 17 can be formed on the second side surface 10b. Also, when the contraction reducing agent and the sintering accelerator are used together, the first uneven part 16 and the second uneven part 17 can be easily formed.

By such a method, the paste for the positive electrode current collector layer 11A, the paste for the positive electrode active material layer 11B, the paste for the solid electrolyte layer 13, the paste for the negative electrode active material layer 12B, and the paste for the negative electrode current collector layer 12A are made.

Next, a laminated sheet is made. The laminated sheet can be made, for example, by using a method of making a positive electrode active material layer unit and a negative electrode active material layer unit to be described below and laminating them.

First, the paste for the solid electrolyte layer 13 is applied on a base material such as a PET film by a doctor blade method and then dried to form the sheet-shaped solid electrolyte layer 13. Next, the paste for the positive electrode active material layer 11B is printed on the solid electrolyte layer 13 by screen printing and then dried to form the positive electrode active material layer 11B.

Next, the paste for the positive electrode current collector layer 11A is printed on the positive electrode active material layer 11B by screen printing and then dried to form the positive electrode current collector layer 11A.

Further, the paste for the positive electrode active material layer 11B is printed on the positive electrode current collector layer 11A by screen printing and then dried to form the positive electrode active material layer 11B.

At this time, the positive electrode margin layer 14 may be formed by printing the paste for the positive electrode margin layer 14 on a portion of the solid electrolyte layer 13 on which the positive electrode active material layer 11B, the positive electrode current collector layer 11A, and the positive electrode active material layer 11B are not formed by screen printing and then drying. Further, since the positive electrode margin layer 14-1 and the negative electrode margin layer 15-1 can be formed in the same process as the positive electrode margin layer 14 and the negative electrode margin layer 15, description thereof will be omitted.

Thereafter, the PET film is peeled off to obtain the positive electrode active material layer unit. The positive electrode active material layer unit is a laminated sheet in which the solid electrolyte layer 13/the positive electrode active material layer 11B/the positive electrode current collector layer 11A/the positive electrode active material layer 11B are laminated in that order.

The negative electrode active material layer unit is made by the same procedure. This negative electrode active material layer unit is a laminated sheet in which the solid electrolyte layer 13/the negative electrode active material layer 12B/the negative electrode current collector layer 12A/the negative electrode active material layer 12B are laminated in that order.

Next, the positive electrode active material layer unit and the negative electrode active material layer unit are laminated.

At this time, the positive electrode active material layer 11B of the positive electrode active material layer unit and the solid electrolyte layer 13 of the negative electrode active material layer unit are laminated to be in contact with each other, or the solid electrolyte layer 13 of the positive electrode active material layer unit and the negative electrode active material layer 12B of the negative electrode active material layer unit are laminated to be in contact with each other. Thereby, a laminated sheet in which the negative electrode active material layer 12B/the negative electrode current collector layer 12A/the negative electrode active material layer 12B/the solid electrolyte layer 13/the positive electrode active material layer 11B/the positive electrode current collector layer 11A/the positive electrode active material layer 11B/the solid electrolyte layer 13 are laminated in that order is obtained.

Thereafter, the positive electrode active material layer unit and the negative electrode active material layer unit are alternately laminated, a solid electrolyte sheet having a predetermined thickness is further laminated on an uppermost layer and a lowermost layer of the laminate in which the positive electrode active material layer unit and the negative electrode active material unit are laminated, and thereby a laminated sheet is formed.

Next, the manufactured laminated sheet is collectively compressed. The compression is preferably performed while heating. A heating temperature during the compression may be, for example, 40 to 95° C.

Next, the compressed laminated sheet (green sheet laminate) is heated to 500° C. to 750° C. in an atmosphere of, for example, nitrogen, hydrogen, and water vapor to remove a binder. Thereafter, a sintered body is obtained by heating to 600° C. to 1000° C. in an atmosphere of nitrogen, hydrogen, and water vapor to perform calcination.

A calcination time may be, for example, 0.1 to 3 hours. Due to the calcination step, the first uneven part 16 is formed on the first side surface 10a of the sintered body (laminate 10), and the second uneven part 17 is formed on the second side surface 10b.

In the present embodiment, the first uneven part 16 and the second uneven part 17 are formed by using the contraction reducing agent and/or the sintering accelerator, but the present invention is not limited thereto. For example, the first uneven part 16 and the second uneven part 17 may also be formed by processing with a laser beam or processing using a mold having an uneven shape.

When processing with a laser beam is performed, for example, a groove having a width and a depth of micron order is formed by irradiating the first side surface 10a of the sintered body (laminate 10) with a laser beam such as ultrashort pulse laser having a beam spot diameter of micron order and a pulse width on the order of picoseconds to nanoseconds while sweeping in a direction substantially perpendicular to the lamination direction, and thereby the first uneven part 16 is formed. Also, a groove is formed by irradiating the second side surface 10b of the sintered body (laminate 10) with the same laser beam as described above while sweeping in a direction substantially perpendicular to the lamination direction, and thereby the second uneven part 17 is formed.

At this time, it is preferable to irradiate the solid electrolyte layer 13 and the negative electrode margin layer 15 on the first side surface 10a with the laser beam. Thereby, the first protruding part 16a of the first uneven part 16 can be formed by the first positive electrode end portion 11a, and the first recessed part 16b of the first uneven part 16 can be formed by the solid electrolyte layer 13 and the negative electrode margin layer 15. Also, it is preferable to irradiate the solid electrolyte layer 13 and the positive electrode margin layer 14 on the second side surface 10b with the laser beam. Thereby, the second protruding part 17a of the second uneven part 17 can be formed by the first negative electrode end portion 12a, and the second recessed part 17b of the second uneven part 17 can be formed by the solid electrolyte layer 13 and the positive electrode margin layer 14.

A groove is formed by irradiating the third side surface 10c of the sintered body (laminate 10) with the first uneven part 16 having a spot diameter of micron order while sweeping in a direction substantially perpendicular to the lamination direction, and thereby the first uneven part 16 is formed. Also, a groove is formed by irradiating the second side surface 10b of the sintered body (laminate 10) with the same laser beam as described above while sweeping in a direction substantially perpendicular to the lamination direction, and thereby the second uneven part 17 is formed.

In that case, the laser beam may be irradiated to the solid electrolyte layer 13 of the third side surface 10c and/or the solid electrolyte layer 13 of the fourth side surface 10d. Thereby, the third protruding part 18a of the third uneven part 18 can be formed by the third positive electrode end portion 11c and the third negative electrode end portion 12c, and the third recessed part 18b of the third uneven part 18 can be formed by the solid electrolyte layer 13. Also, the fourth protruding part 19a of the fourth uneven part 19 can be formed by the fourth positive electrode end portion 11d and the fourth negative electrode end portion 12d, and the fourth recessed part 19b of the fourth uneven part 19 can be formed by the solid electrolyte layer 13.

The obtained sintered body may be put into a cylindrical container together with an abrasive such as alumina and subjected to barrel polishing. Thereby, corners of the laminate 10 can be chamfered. As another method, the laminate 10 may be polished by sandblasting. This method is preferable because only a specific part can be scraped off. With the steps described above, the laminate 10 can be obtained.

Then, the outer electrodes 21 and 22 are formed on the first side surface 10a and the second side surface 10b of the laminate 10 made by the above-described procedure. The outer electrodes 21 and 22 are formed as a single-layer structure or a multi-layer structure obtained by a known method. Thereby, the all-solid-state battery 1 including the laminate 10 is manufactured.

As described above, according to the present embodiment, since the all-solid-state battery 1 includes the first uneven part 16 formed on the first side surface 10a of the laminate 10 and the second uneven part 17 formed on the second side surface 10b of the laminate 10, the volume expansion and contraction of the laminate 10 due to charging and discharging is sufficiently alleviated, cracks due to the volume expansion and contraction do not easily occur, and excellent cycle characteristics can be obtained.

The all-solid-state battery 1 includes the first uneven part 16 and the second uneven part 17, but the present invention is not limited thereto, and the all-solid-state battery 1 may include either of the first uneven part 16 formed on the first side surface 10a of the laminate 10 and the second uneven parts 17 formed on the second side surface 10b of the laminate 10. Even with this configuration, the same effects as described above can be obtained.

Also, since the all-solid-state battery 1 includes the third uneven part 18 formed on the third side surface 10c of the laminate 10 and the fourth uneven part 19 formed on the fourth side surface 10d of the laminate 10, the volume expansion and contraction of the laminate 10 due to charging and discharging can be further alleviated, and more excellent cycle characteristics can be obtained.

The all-solid-state battery 1 includes the third uneven part 18 and the fourth uneven part 19, but the present invention is not limited thereto, and the all-solid-state battery 1 may include either of the third uneven part 18 formed on the third side surface 10c of the laminate 10 and the fourth uneven part 19 formed on the fourth side surface 10d of the laminate 10. Even with this configuration, the same effects as described above can be obtained. Also, for convenience of explanation, the third uneven part 18 and the fourth uneven part 19 have been distinguished for explanation, but since the laminate 10 is normally formed plane-symmetrically with respect to a center position in the W direction, the configuration of the fourth uneven part 19 is the same as the configuration of the third uneven part 18.

The uneven part in the all-solid-state battery 1 is formed for each type of layer, but not all layers need to form the uneven part. The recessed part or the protruding part is preferably formed by 60% or more of a total number of the layers, and more preferably 80% or more of the total number of the layers.

Figure 5A:
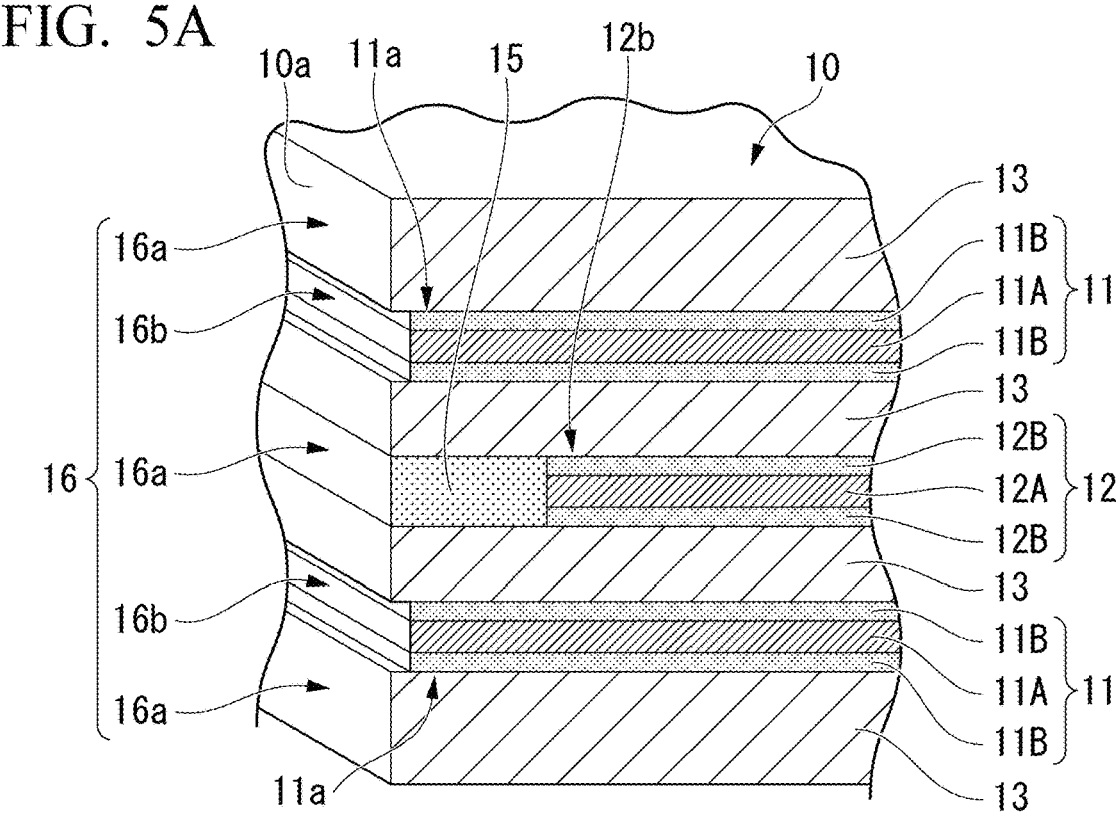
FIG. 5A is a partial cross-sectional perspective view illustrating a modified example of FIG. 2A.
Figure 5B:
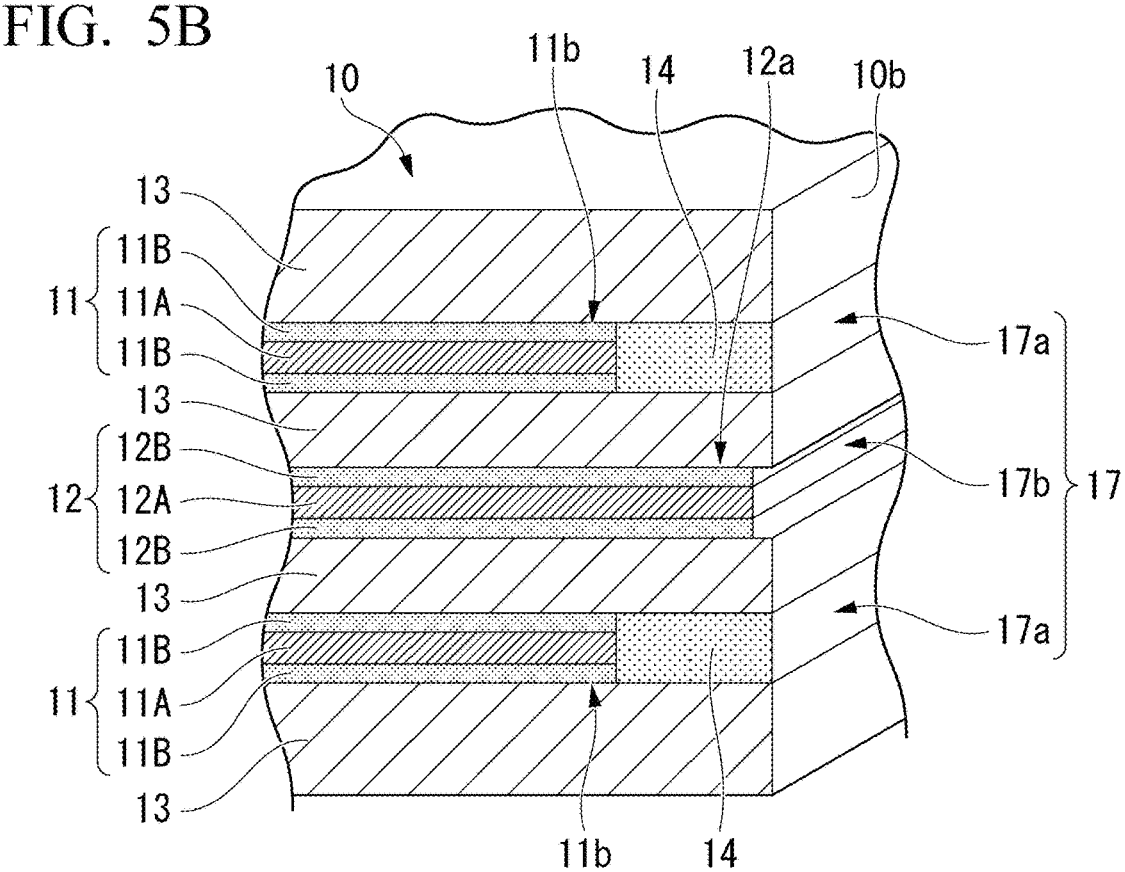
FIG. 5B is a partial cross-sectional perspective view illustrating a modified example of FIG. 2B.

FIG. 5A is a partial cross-sectional perspective view illustrating a modified example of FIG. 2A, and FIG. 5B is a partial cross-sectional perspective view illustrating a modified example of FIG. 2B.

In the present modified example, members constituting the protruding parts and the recessed parts of the first uneven part 16 to the fourth uneven part 19 are different from those in the above-described embodiment.

As illustrated in FIG. 5A, in the present modified example, on the first side surface 10a of the laminate 10, the first protruding part 16a of the first uneven part 16 is formed by the solid electrolyte layer 13 and the negative electrode margin layer 15, and the first recessed part 16b of the first uneven part 16 is formed by the first positive electrode end portion 11a. Also, as illustrated in FIG. 5B, on the second side surface 10b of the laminate 10, the second protruding part 17a of the second uneven part 17 is formed by the solid electrolyte layer 13 and the positive electrode margin layer 14, and the second recessed part 17b of the second uneven part 17 is formed by the first negative electrode end portion 12a.

In the present modified example, the ten-point average roughness Rzjis of the first side surface 10a is preferably 1.0 µm or more, more preferably 1.0 µm or more and 12 µm or less, still more preferably 1.0 µm or more and 10 µm or less, and particularly preferably 3.0 µm or more and 5.0 µm or less from the same viewpoint as the above-described embodiment.

The ten-point average roughness Rzjis of the second side surface 10b is preferably 1.0 µm or more, more preferably 1.0 µm or more and 12 µm or less, still more preferably 1.0 µm or more and 10 µm or less, and particularly preferably 3.0 µm or more and 5.0 µm or less from the same viewpoint as the above-described embodiment.

Figure 6A:
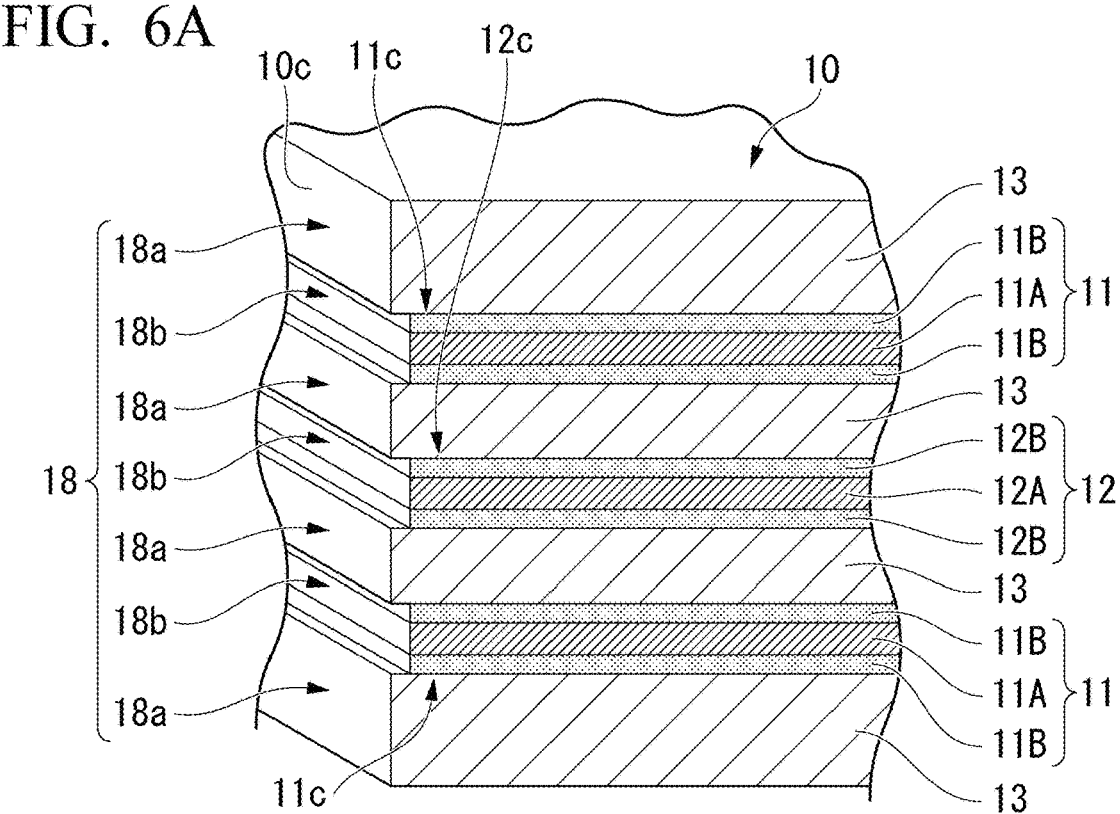
FIG. 6A is a partial cross-sectional perspective view illustrating a modified example of FIG. 3A.
Figure 6B:
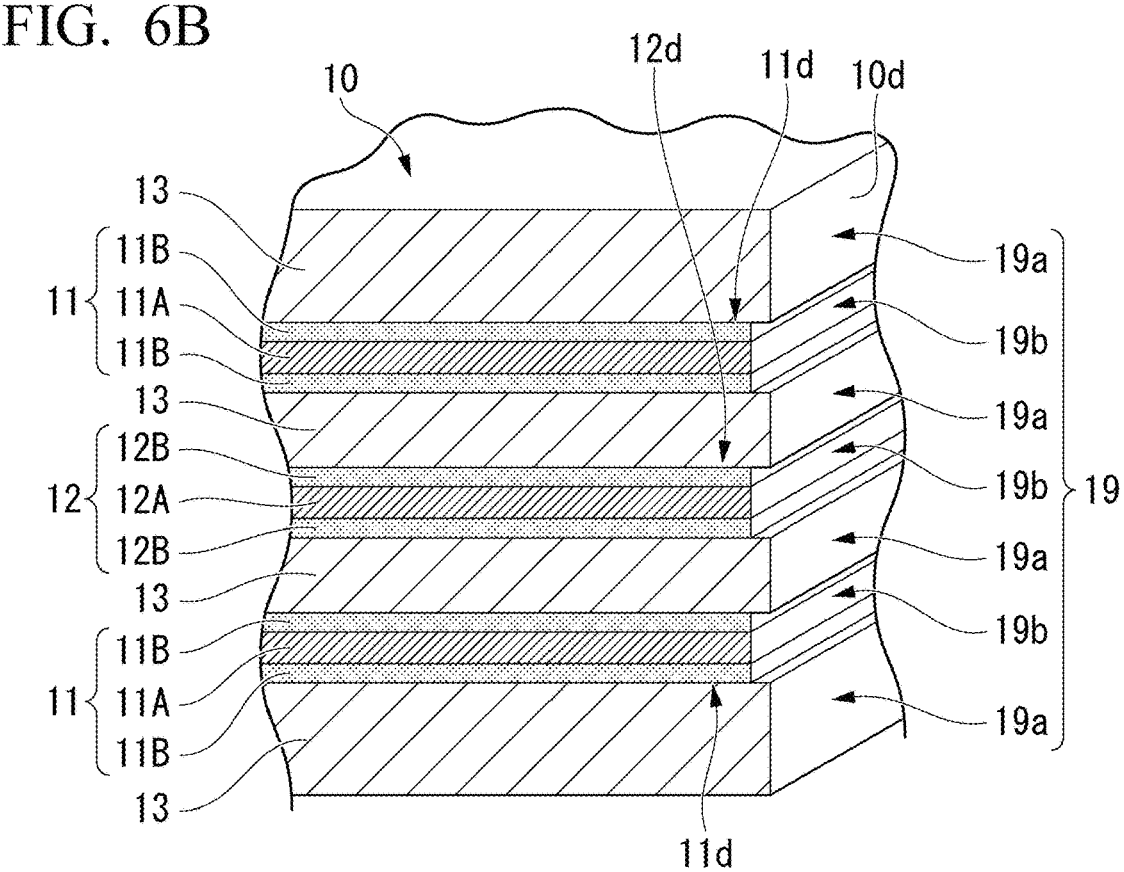
FIG. 6B is a partial cross-sectional perspective view illustrating a modified example of FIG. 3B.

FIG. 6A is a partial cross-sectional perspective view illustrating a modified example of FIG. 3A, and FIG. 6B is a partial cross-sectional perspective view illustrating a modified example of FIG. 3B.

As illustrated in FIG. 6A, in the present modified example, on the third side surface 10c of the laminate 10, the third protruding part 18a of the third uneven part 18 can be formed by the solid electrolyte layer 13, and the third recessed part 18b of the third uneven part 18 can be formed by the third positive electrode end portion 11c and the third negative electrode end portion 12c. However, the third protruding part 18a of the third uneven part 18 may be formed by either of the third positive electrode end portion 11c and the third negative electrode end portion 12c.

On the fourth side surface 10d of the laminate 10, the fourth protruding part 19a of the fourth uneven part 19 can be formed by the solid electrolyte layer 13, and the fourth recessed part 19b of the fourth uneven part 19 can be formed by the fourth positive electrode end portion 11d and the fourth negative electrode end portion 12d. However, the fourth protruding part 19a of the fourth uneven part 19 may be formed by either of the fourth positive electrode end portion 11d and the fourth negative electrode end portion 12d.

In the present modified example, the ten-point average roughness Rzjis of the third side surface 10c is preferably 1.0 µm or more, more preferably 1.0 µm or more and 12 µm or less, still more preferably 1.0 µm or more and 10 µm or less, and particularly preferably 3.0 µm or more and 5.0 µm or less from the same viewpoint as the above-described embodiment.

The ten-point average roughness Rzjis of the fourth side surface 10d is preferably 1.0 µm or more, more preferably 1.0 µm or more and 12 µm or less, still more preferably 1.0 µm or more and 10 µm or less, and particularly preferably 3.0 µm or more and 5.0 µm or less from the same viewpoint as the above-described embodiment.

When the first uneven part 16 and the second uneven part 17 are formed in the present modified example, similarly to the above-described embodiment, the contraction reducing agent and/or the above-described sintering accelerator may be used, or processing with a laser beam or processing using a mold having an uneven shape may be performed.

When the contraction reducing agent and/or the above-described sintering accelerator are used, the sintering accelerator can be added to the paste for the positive electrode current collector layer 11A, the paste for the positive electrode active material layer 11B, the paste for the negative electrode current collector layer 12A, and the paste for the negative electrode active material layer 12B in the step of forming the laminate 10. Also, the contraction reducing agent may be added to the paste for the solid electrolyte layer 13, the paste for the positive electrode margin layer 14, and the paste for the negative electrode margin layer 15.

When a laser beam is used, the laser beam is irradiated to the positive electrode layer 11 on the first side surface 10a and the negative electrode layer 12 on the second side surface 10b. Thereby, the first protruding part 16a of the first uneven part 16 can be formed by the solid electrolyte layer 13 and the negative electrode margin layer 15, and the first recessed part 16b of the first uneven part 16 can be formed by the first positive electrode end portion 11a. Also, the second protruding part 17a of the second uneven part 17 can be formed by the solid electrolyte layer 13 and the positive electrode margin layer 14, and the second recessed part 17b of the second uneven part 17 can be formed by the first negative electrode end portion 12a.

The laser beam may be irradiated to the positive electrode layer 11 on the third side surface 10c and the fourth side surface 10d, and/or the negative electrode layer 12 on the third side surface 10c and the fourth side surface 10d. Thereby, the third protruding part 18a of the third uneven part 18 can be formed by the solid electrolyte layer 13, and the third recessed part 18b of the third uneven part 18 can be formed by the third positive electrode end portion 11c and the third negative electrode end portion 12c. Also, the fourth protruding part 19a of the fourth uneven part 19 can be formed by the solid electrolyte layer 13, and the fourth recessed part 19b of the fourth uneven part 19 can be formed by the fourth positive electrode end portion 11d and the fourth negative electrode end portion 12d.

As described above, also in the present modified example, since the all-solid-state battery 1 includes the first uneven part 16 formed on the first side surface 10a of the laminate 10 and the second uneven part 17 formed on the second side surface 10b of the laminate 10, the volume expansion and contraction of the laminate 10 due to charging and discharging is sufficiently alleviated, cracks due to the volume expansion and contraction do not easily occur, and excellent cycle characteristics can be obtained.

Figure 7:
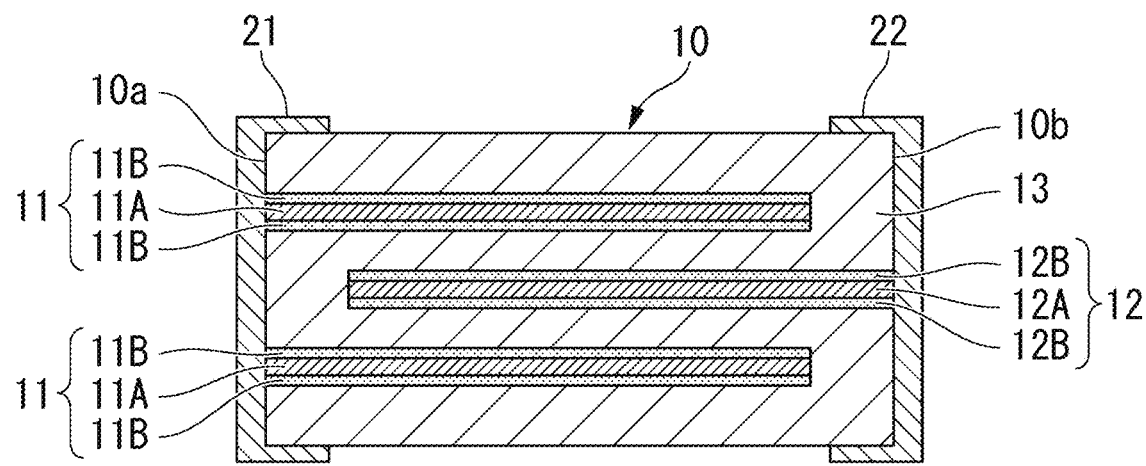
FIG. 7 is a cross-sectional view illustrating a modified example of FIG. 1B.

FIG. 7 is a cross-sectional view illustrating a modified example of FIG. 1B. FIG. 7 is different from the cross-sectional view illustrated in FIG. 1B in that the laminate 10 does not have the positive electrode margin layer 14 and the negative electrode margin layer 15. Other configurations are the same as those of the laminate 10 of the above-described embodiment, and description thereof will be omitted.

In the present modified example, on the first side surface 10a of the laminate 10, the first protruding part 16a of the first uneven part 16 is formed by the first positive electrode end portion 11a, and the first recessed part 16b of the first uneven part 16 is formed only by the solid electrolyte layer 13. Also, on the second side surface 10b of the laminate 10, the second protruding part 17a of the second uneven part 17 is formed by the first negative electrode end portion 12a, and the second recessed part 17b of the second uneven part 17 is formed only by the solid electrolyte layer 13.

The laminate 10 in the present modified example can be formed by bonding two adjacent solid electrolyte layers 13 and 13 together. In the present modified example, it is difficult to eliminate a step between the positive electrode layer 11 or the negative electrode layer 12 and the solid electrolyte layer 13, but since formation of the positive electrode margin layer 14 and the negative electrode margin layer 15 is not necessary, the process can be simplified.

While embodiments of the present invention have been described above in detail, the present invention is not limited to the above-described embodiment, and various modifications and changes can be made within the gist of the present invention described in the claims.

EXAMPLES

Hereinafter, examples of the present invention will be described. The present invention is not limited only to the following examples.

Examples 1 to 6

An all-solid-state battery element body (laminate) having a size of 4.80 mm×3.30 mm×1.22 mm was made by the above-described manufacturing method using copper as the positive electrode current collector layer, $Li_3V_2(PO_4)_3$ as the positive electrode active material layer, copper as the negative electrode current collector layer, $Li_3V_2(PO_4)_3$ as the negative electrode active material layer, $Li_{1.3}Al_{0.3}Ti_{1.7}(PO_4)_3$ as the solid electrolyte layer, $Li_{1.3}Al_{0.3}Ti_{1.7}(PO_4)_3$ as the positive electrode margin layer, and $Li_{1.3}Al_{0.3}Ti_{1.7}(PO_4)_3$ as the negative electrode margin layer. Two side surfaces (first side surface and second side surface) of the laminate in the L direction were processed by a laser beam to form a first uneven part and a second uneven part. At this time, on the first side surface, a first protruding part was formed by the positive electrode layer, and a first recessed part was formed by the solid electrolyte layer and the negative electrode margin layer. Also, on the second side surface, a second protruding part was formed by the negative electrode layer, and a second recessed part was formed by the solid electrolyte layer and the positive electrode margin layer. Then, as examples 1 to 6, an average value of a ten-point average roughness Rzjis of the first uneven part on the first side surface and a ten-point average roughness Rzjis of the second uneven part on the second side surface of the laminate was made to be the value shown in Table 1. Thereafter, outer electrodes were formed on the first side surface side and the second side surface side of the laminate by a known method to manufacture the all-solid-state battery.

EXAMPLES 7 TO 12

An all-solid-state battery was made in the same manner as in examples 1 to 6 except that only a first uneven part was formed on one side surface (only the first side surface) of the laminate in the L direction.

Examples 13 to 18

An all-solid-state battery was made in the same manner as in examples 1 to 6 except that a first uneven part and a second uneven part were formed on two side surfaces (first side surface and second side surface) in the L direction and a third uneven part and a fourth uneven part were formed on two side surfaces (third side surface and fourth side surface) in the W direction of the laminate. On a third side surface, a third protruding part was formed by the positive electrode layer and the negative electrode layer, and a third recessed part was formed by the solid electrolyte layer. Also, on a fourth side surface, a fourth protruding part was formed by the positive electrode layer and the negative electrode layer, and a fourth recessed part was formed by the solid electrolyte layer. At this time, an average value of the ten-point average roughness Rzjis was set to an average value of a ten-point average roughness Rzjis of the first uneven part on the first side surface and a ten-point average roughness Rzjis of the second uneven part on the second side surface of the laminate, and a ten-point average roughness Rzjis of the third uneven part on the third side surface and a ten-point average roughness Rzjis of the fourth uneven part on the fourth side surface of the laminate.

Examples 19 to 24

An all-solid-state battery was made in the same manner as in examples 1 to 6 except that a first protruding part was formed by the solid electrolyte layer and the negative electrode margin layer and a first recessed part was formed by the positive electrode layer on the first side surface, and a second protruding part was formed by the solid electrolyte layer and the positive electrode margin layer and a second recessed part was formed by the negative electrode layer on the second side surface.

Example 25 to 30

A laminate was made in the same manner as in examples 1 to 6 except that the positive electrode margin layer and the negative electrode margin layer were not formed. Further, an all-solid-state battery was made in the same manner as in examples 1 to 6 except that a first protruding part was formed by the positive electrode layer and a first recessed part was formed by the solid electrolyte layer on the first side surface, and a second protruding part was formed by the negative electrode layer and a second recessed part was formed by the solid electrolyte layer on the second side surface.

Comparative Example 1

An all-solid-state battery was made in the same manner as in examples 1 to 6 except that the uneven part was not provided on any of end surfaces in the L direction and end surfaces in the W direction of the all-solid-state battery element body.

Next, the all-solid-state batteries obtained by the above-described examples and comparative example were measured and evaluated by the following methods.

[Ten-Point Average Roughness Rzjis]

Figure 8:
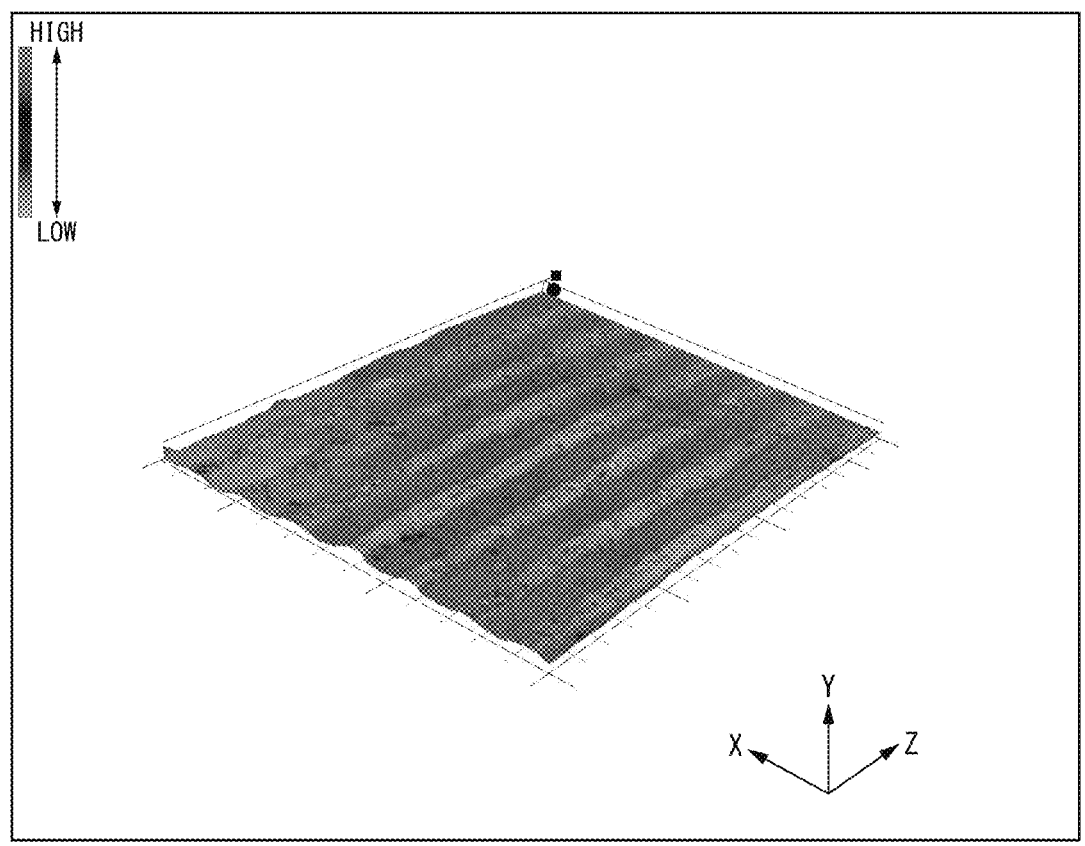
FIG. 8 is a perspective view showing a result of measuring a side surface of the all-solid-state battery in an example with a microscope.

For examples 1 to 30, one side surface (first side surface) in the L direction of the manufactured all-solid-state battery was observed using a microscope (manufactured by Keyence, product name "VHX-5000"), and a perspective view as shown in FIG. 8 was obtained for an arbitrary region on the one side surface (the first side surface) in the L direction. As a result, a first uneven part was ascertained on the one side surface (the first side surface) in the L direction.

Also, for examples 1 to 6 and 13 to 30, as a result of observing one side surface (second side surface) in the L direction of the manufactured all-solid-state battery in the same manner as described above, a second uneven part was ascertained on the one side surface (the second side surface) in the L direction.

Further, for examples 7 to 12, as a result of observing two side surfaces (third side surface and fourth side surface) in the W direction of the manufactured all-solid-state battery in the same manner as described above, a third uneven part and a fourth uneven part were ascertained in the two side surfaces (the third side surface and the fourth side surface) in the W direction.

Figure 9:
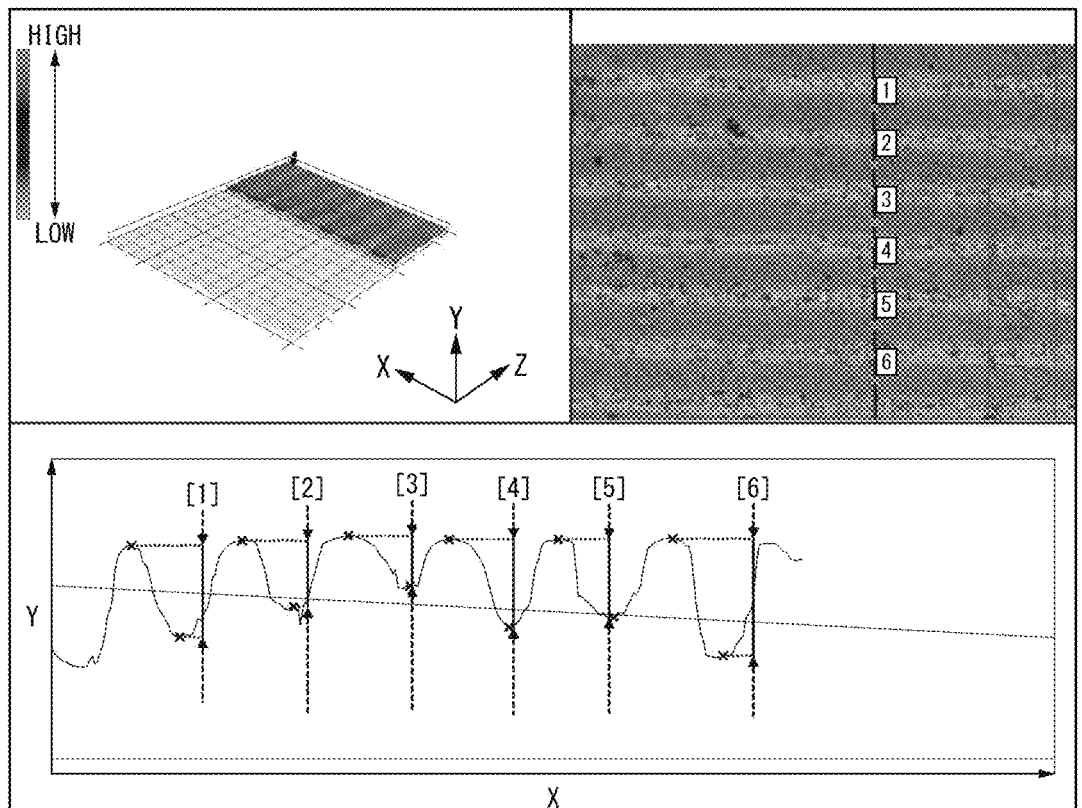
FIGS. 9(a) to 9(c) are views for explaining a method of measuring a ten-point average roughness Rzjis of a side surface in an example.

Next, for each example, as illustrated in FIGS. 9(a) and 9(b), a straight line was drawn from an uppermost layer to a lowermost layer in the lamination direction of the all-solid-state battery element body (laminate) at a position 200 μm from one end of the obtained perspective view, and a roughness curve of the uneven part as shown in FIG. 9(c) was obtained on the basis of a cross-sectional shape thereof. Then, a ten-point average roughness Rzjis of each uneven part was obtained from the obtained roughness curve.

For the ten-point average roughness Rzjis, only a reference length in a direction of an average line thereof was taken out from the roughness curve, a sum of an average value of absolute values of heights (Yp) of peaks from a highest peak to a fifth peak and an average value of absolute values of heights (Yv) of valley bottoms from a lowest valley bottom to a fifth valley bottom measured in a direction of longitudinal magnification from the average line of the above-described taken-out portion was obtained, and this value was expressed in micrometers (μm). The results are shown in Table 1.

[Capacity Retention Rate]

Figure 10:
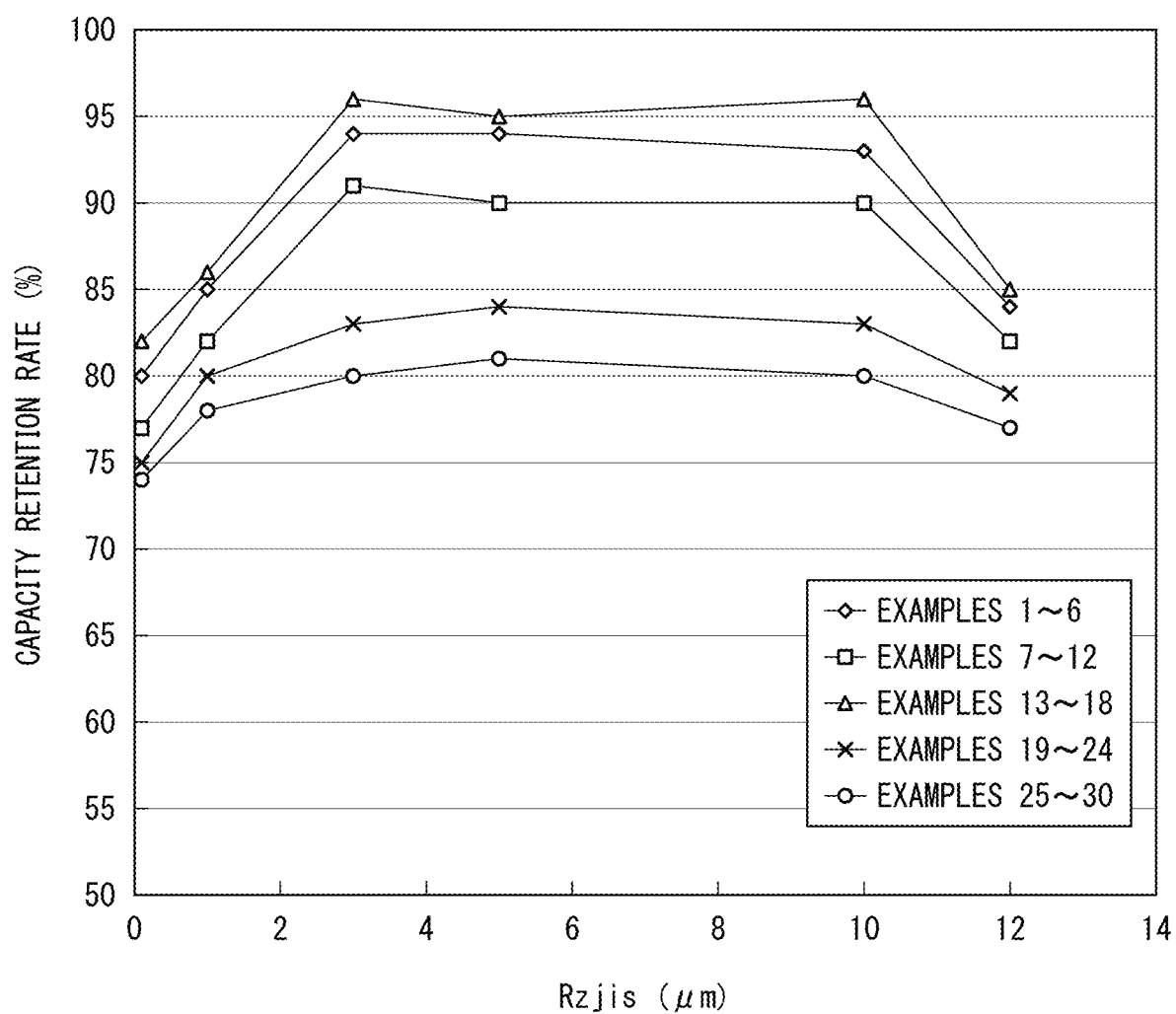
FIG. 10 is a graph showing a relationship between a ten-point average roughness Rzjis measured in examples and a capacity retention rate.

As cycle characteristics, lead wires were attached to two outer electrodes to perform a charge/discharge test, and an initial discharge capacity and a capacity retention rate after 1000 cycles of the all-solid-state battery were measured. Measurement conditions were that a current during charging and discharging was 0.2 μA, and final voltages during charging and discharging were set to 1.6V and 0 V. A capacity at the time of a first discharge was set as an initial discharge capacity, and a discharge capacity at a 1000th cycle was divided by the initial discharge capacity to obtain the capacity retention rate. The results are shown in Table 1. Also, FIG. 10 shows a relationship between the ten-point average roughness Rzjis measured in examples and the capacity retention rate.

TABLE 1

|  | Position of unevenness | Layers forming unevenness on first side surface and second side surface of laminate | | Rzjis (μm) | Capacity retention rate (1000 cycles) (%) |
| --- | --- | --- | --- | --- | --- |
|  |  | Protruding part | Recessed part |  |  |
| Example 1 | First side surface and second side surface of laminate | Electrode layer | Solid electrolyte layer/margin layer | 0.1 | 80 |
| Example 2 | | Electrode layer | Solid electrolyte layer/margin layer | 1 | 85 |
| Example 3 | | Electrode layer | Solid electrolyte layer/margin layer | 3 | 94 |
| Example 4 | | Electrode layer | Solid electrolyte layer/margin layer | 5 | 94 |
| Example 5 | | Electrode layer | Solid electrolyte layer/margin layer | 10 | 93 |

TABLE 1-continued

| | Position of unevenness | Layers forming unevenness on first side surface and second side surface of laminate | | Rzjis (μm) | Capacity retention rate (1000 cycles) (%) |
|---|---|---|---|---|---|
| | | Protruding part | Recessed part | | |
| Example 6 | | Electrode layer | Solid electrolyte layer layer/margin layer | 12 | 84 |
| Example 7 | First side surface of laminate | Electrode layer | Solid electrolyte layer layer/margin layer | 0.1 | 77 |
| Example 8 | | Electrode layer | Solid electrolyte layer layer/margin layer | 1 | 82 |
| Example 9 | | Electrode layer | Solid electrolyte layer layer/margin layer | 3 | 91 |
| Example 10 | | Electrode layer | Solid electrolyte layer layer/margin layer | 5 | 90 |
| Example 11 | | Electrode layer | Solid electrolyte layer layer/margin layer | 10 | 90 |
| Example 12 | | Electrode layer | Solid electrolyte layer layer/margin layer | 12 | 82 |
| Example 13 | First side surface to fourth side surface of laminate | Electrode layer | Solid electrolyte layer layer/margin layer | 0.1 | 82 |
| Example 14 | | Electrode layer | Solid electrolyte layer layer/margin layer | 1 | 86 |
| Example 15 | | Electrode layer | Solid electrolyte layer layer/margin layer | 3 | 96 |
| Example 16 | | Electrode layer | Solid electrolyte layer layer/margin layer | 5 | 95 |
| Example 17 | | Electrode layer | Solid electrolyte layer layer/margin layer | 10 | 96 |
| Example 18 | | Electrode layer | Solid electrolyte layer layer/margin layer | 12 | 85 |
| Example 19 | First side surface and second side surface of laminate | Solid electrolyte layer layer/margin layer | Electrode layer | 0.1 | 75 |
| Example 20 | | Solid electrolyte layer layer/margin layer | Electrode layer | 1 | 80 |
| Example 21 | | Solid electrolyte layer layer/margin layer | Electrode layer | 3 | 83 |
| Example 22 | | Solid electrolyte layer layer/margin layer | Electrode layer | 5 | 84 |
| Example 23 | | Solid electrolyte layer layer/margin layer | Electrode layer | 10 | 83 |
| Example 24 | | Solid electrolyte layer layer/margin layer | Electrode layer | 12 | 79 |
| Example 25 | First side surface and second side surface of laminate | Electrode layer | Solid electrolyte layer | 0.1 | 74 |
| Example 26 | | Electrode layer | Solid electrolyte layer | 1 | 78 |
| Example 27 | | Electrode layer | Solid electrolyte layer | 3 | 80 |
| Example 28 | | Electrode layer | Solid electrolyte layer | 5 | 81 |
| Example 29 | | Electrode layer | Solid electrolyte layer | 10 | 80 |
| Example 30 | | Electrode layer | Solid electrolyte layer | 12 | 77 |
| Comparative example 1 | — | None | None | 0 | 72 |

From the results of Table 1 and FIG. 10, it was found that, in all examples 1 to 6, the Rzjis was within a range of 0.1 μm or more and 12 μm or less, the capacity retention rate when the uneven parts were formed on two side surfaces of the laminate was higher than the capacity retention rate of comparative example 1 having no uneven part, and excellent cycle characteristics could be obtained.

It was found that, in all examples 7 to 12, the Rzjis was within a range of 0.1 μm or more and 12 μm or less, the capacity retention rate when the uneven part was formed on only one side surface of the laminate was higher than the capacity retention rate of comparative example 1 having no uneven part, and excellent cycle characteristics could be obtained.

It was found that, in all examples 13 to 18, the Rzjis was within a range of 0.1 μm or more and 12 μm or less, the capacity retention rate when the uneven parts were formed on four side surfaces of the laminate was higher than the capacity retention rate of comparative example 1 having no uneven part, and excellent cycle characteristics could be obtained. Also, when examples 13 to 18 and examples 7 to 12 were compared, it was found that the capacity retention rate when the uneven parts were formed on four side surfaces of the laminate was higher than the capacity retention rate when the uneven part was formed on only one side surface in a case in which the Rzjis values were the same as each other. Further, when examples 13 to 18 and examples 1 to 6 were compared, it was found that the capacity retention rate when the uneven parts were formed on four side surfaces of the laminate was higher than the capacity retention rate when the uneven parts were formed on two side surfaces in a case in which the Rzjis values were the same as each other.

It was found that, in all examples 19 to 24, the Rzjis was within a range of 0.1 μm or more and 12 μm or less, the capacity retention rate when the uneven parts were formed on two side surfaces of the laminate was higher than the capacity retention rate of comparative example 1 in which the uneven part was not provided, and excellent cycle characteristics could be obtained.

It was found that, in all examples 25 to 30, the Rzjis was within a range of 0.1 μm or more and 12 μm or less, the capacity retention rate when the uneven parts were formed on two side surfaces of the laminate was higher than the capacity retention rate of comparative example 1 in which the uneven part was not provided, and excellent cycle characteristics could be obtained. Also, when examples 25 to 30 and examples 1 to 6 were compared, it was found that the capacity retention rate when the margin layer was formed was higher than the capacity retention rate when the margin layer was not formed in a case in which the Rzjis values were the same as each other.

INDUSTRIAL APPLICABILITY

According to the present invention, it is possible to provide an all-solid-state battery in which volume expansion and contraction due to a charge/discharge reaction can be sufficiently suppressed and excellent cycle characteristics can be obtained.

REFERENCE SIGNS LIST

1 All-solid-state battery
10 Laminate
10a First side surface
10b Second side surface
10c Third side surface
10d Fourth side surface
11 Positive electrode layer
11A Positive electrode current collector layer
11B Positive electrode active material layer
11a First positive electrode end portion
11b Second positive electrode end portion
11c Third positive electrode end portion
11d Fourth positive electrode end portion
12 Negative electrode layer
12A Negative electrode current collector layer
12B Negative electrode active material layer
12a First negative electrode end portion
12b Second negative electrode end portion
12c Third negative electrode end portion
12d Fourth negative electrode end portion
13 Solid electrolyte layer
14 Positive electrode margin layer
14-1 Positive electrode margin layer
15 Negative electrode margin layer
15-1 Negative electrode margin layer
16 First uneven part
16a First protruding part
16b First recessed part
17 Second uneven part
17a Second protruding part
17b Second recessed part
18 Third uneven part
18a Third protruding part
18b Third recessed part
19 Fourth uneven part
19a Fourth protruding part
19b Fourth recessed part
21 Outer electrode
22 Outer electrode

The invention claimed is:

1. An all-solid-state battery comprising a laminate in which: a positive electrode layer including a positive electrode current collector layer and a positive electrode active material layer; and a negative electrode layer including a negative electrode current collector layer and a negative electrode active material layer, are alternately laminated with a solid electrolyte layer interposed therebetween, wherein
   the positive electrode layer includes a first positive electrode end portion exposed on a first side surface of the laminate and a second positive electrode end portion not exposed on a second side surface on a side opposite to the first side surface,
   the negative electrode layer includes a first negative electrode end portion exposed on the second side surface of the laminate and a second negative electrode end portion not exposed on the first side surface of the laminate, and
   the laminate includes at least one of a first uneven part formed on the first side surface of the laminate and a second uneven part formed on the second side surface of the laminate,
   the laminate includes a third side surface positioned to a lateral side of the first side surface and the second side surface,
   the positive electrode layer includes a third positive electrode end portion positioned to a lateral side of the first positive electrode end portion and the second positive electrode end portion and configured to be exposed on the third side surface,
   the negative electrode layer includes a third negative electrode end portion positioned to a lateral side of the first negative electrode end portion and the second negative electrode end portion and configured to be exposed on the third side surface, and
   a third uneven part is provided to be formed on the third side surface of the laminate.

2. The all-solid-state battery according to claim 1, wherein the laminate further includes:
   a positive electrode margin layer disposed between the second positive electrode end portion and the second side surface and interposed between two solid electrolyte layers adjacent to each other; and
   a negative electrode margin layer disposed between the second negative electrode end portion and the first side surface and interposed between two solid electrolyte layers adjacent to each other.

3. The all-solid-state battery according to claim 2, wherein a ten-point average roughness Rzjis of the first side surface is 1.0 μm or more in a lamination direction of the laminate.

4. The all-solid-state battery according to claim 3, wherein the ten-point average roughness Rzjis of the first side surface is 12.0 μm or less in the lamination direction of the laminate.

5. The all-solid-state battery according to claim 2, wherein a first protruding part of the first uneven part is formed by the first positive electrode end portion, and a first recessed part of the first uneven part is formed by the solid electrolyte layer and the negative electrode margin layer.

6. The all-solid-state battery according to claim 2, wherein a first protruding part of the first uneven part is formed by the solid electrolyte layer and the negative electrode margin layer, and a first recessed part of the first uneven part is formed by the first positive electrode end portion.

7. The all-solid-state battery according to claim 2, wherein a ten-point average roughness Rzjis of the second side surface is 1.0 μm or more in the lamination direction of the laminate.

8. The all-solid-state battery according to claim 7, wherein the ten-point average roughness Rzjis of the second side surface is 12.0 μm or less in the lamination direction of the laminate.

9. The all-solid-state battery according to claim 2, wherein a second protruding part of the second uneven part is formed by the first negative electrode end portion, and a second recessed part of the second uneven part is formed by the solid electrolyte layer and the positive electrode margin layer.

10. The all-solid-state battery according to claim 2, wherein a second protruding part of the second uneven part is formed by the solid electrolyte layer and the positive electrode margin layer, and a second recessed part of the second uneven part is formed by the first negative electrode end portion.

11. The all-solid-state battery according to claim 1, wherein a ten-point average roughness Rzjis of the first side surface is 1.0 μm or more in a lamination direction of the laminate.

12. The all-solid-state battery according to claim 11, wherein the ten-point average roughness Rzjis of the first side surface is 12.0 μm or less in the lamination direction of the laminate.

13. The all-solid-state battery according to claim 1, wherein a first protruding part of the first uneven part is formed by the first positive electrode end portion, and a first recessed part of the first uneven part is formed by the solid electrolyte layer.

14. The all-solid-state battery according to claim 1, wherein a first protruding part of the first uneven part is formed by the solid electrolyte layer, and a first recessed part of the first uneven part is formed by the first positive electrode end portion.

15. The all-solid-state battery according to claim 1, wherein a ten-point average roughness Rzjis of the second side surface is 1.0 μm or more in the lamination direction of the laminate.

16. The all-solid-state battery according to claim 15, wherein the ten-point average roughness Rzjis of the second side surface is 12.0 μm or less in the lamination direction of the laminate.

17. The all-solid-state battery according to claim 1, wherein a second protruding part of the second uneven part is formed by the first negative electrode end portion, and a second recessed part of the second uneven part is formed by the solid electrolyte layer.

18. The all-solid-state battery according to claim 1, wherein a second protruding part of the second uneven part is formed by the solid electrolyte layer, and a second recessed part of the second uneven part is formed by the first negative electrode end portion.

19. The all-solid-state battery according to claim 1, wherein a ten-point average roughness Rzjis of the third side surface is 1.0 μm or more in the lamination direction of the laminate.

20. The all-solid-state battery according to claim 19, wherein a ten-point average roughness Rzjis of the third side surface is 12.0 μm or less in the lamination direction of the laminate.

21. The all-solid-state battery according to claim 1, wherein a third protruding part of the third uneven part is formed by at least one of the third positive electrode end portion and the third negative electrode end portion, and a third recessed part of the third uneven part is formed by the solid electrolyte layer.

22. The all-solid-state battery according to claim 1, wherein a third protruding part of the third uneven part is formed by the solid electrolyte layer, and a third recessed part of the third uneven part is formed by at least one of the third positive electrode end portion and the third negative electrode end portion.

* * * * *